(12) United States Patent
Masuda

(10) Patent No.: US 8,203,996 B2
(45) Date of Patent: Jun. 19, 2012

(54) COMMUNICATION DEVICE, WIRELESS COMMUNICATION DEVICE, AND CONTROL METHOD

(75) Inventor: Yasuhiko Masuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 851 days.

(21) Appl. No.: 12/191,612

(22) Filed: Aug. 14, 2008

(65) Prior Publication Data

US 2008/0299966 A1    Dec. 4, 2008

Related U.S. Application Data

(63) Continuation of application No. PCT/JP2006/302650, filed on Feb. 15, 2006.

(51) Int. Cl.
H04W 4/00 (2009.01)
(52) U.S. Cl. .............. 370/328; 370/338; 450/432.1
(58) Field of Classification Search ........... 455/410, 455/411, 432.1–432.3, 434, 435.1–435.3, 455/436–444, 550.1, 552.1, 553.1, 418–421, 455/422.1, 432.1–444, 456.4–456.6, 11.1, 455/13.1, 556.1, 556.2, 557, 560, 561; 370/310.2, 370/328, 331–333, 338, 315, 351–356; 713/150–194; 726/1–36
See application file for complete search history.

(56) References Cited

U.S. PATENT DOCUMENTS

| 6,917,804 | B2 | 7/2005 | Takayama et al. | 455/432.1 |
| 6,978,023 | B2* | 12/2005 | Dacosta | 380/258 |
| 7,269,154 | B2 | 9/2007 | Hosoda et al. | 370/338 |
| 7,606,242 | B2* | 10/2009 | Whelan et al. | 370/401 |
| 7,805,140 | B2* | 9/2010 | Friday et al. | 455/436 |
| 2001/0044295 | A1* | 11/2001 | Saito et al. | 455/410 |
| 2002/0025810 | A1 | 2/2002 | Takayama et al. | 455/432 |
| 2002/0196761 | A1 | 12/2002 | Kaneko | 370/338 |
| 2004/0043767 | A1* | 3/2004 | Tsutsumi et al. | 455/432.1 |
| 2004/0242228 | A1 | 12/2004 | Lee et al. | 455/432.1 |
| 2005/0135310 | A1* | 6/2005 | Cromer et al. | 370/331 |

(Continued)

FOREIGN PATENT DOCUMENTS

EP    1 124 397    8/2001
(Continued)

OTHER PUBLICATIONS

International Preliminary Report on Patentability issued Aug. 19, 2008 in corresponding International Application No. PCT/JP2006/302650 (7 pp).

(Continued)

Primary Examiner — Kent Chang
Assistant Examiner — San Htun
(74) Attorney, Agent, or Firm — Staas & Halsey LLP

(57) ABSTRACT

A communication device that includes an authentication unit that authenticates a wireless communication device depending on whether a predetermined authentication condition is satisfied, and a relay unit that relays communication performed by the wireless communication device when the authentication unit successfully authenticates the wireless communication device, comprising: an information transmission and reception unit receiving connected-terminal information, which includes identification information identifying the wireless communication device whose communication is being relayed, held by other communication devices; a recording unit recording the received connected-terminal information; a judging unit judging, when a connection request is received from the wireless communication device, whether the identification information identifying the wireless communication device is included in the recorded connected-terminal information; and a permitting unit permitting relaying of communication performed by the wireless communication device when the identification information of the wireless communication device is included in the recorded connected-terminal information.

11 Claims, 16 Drawing Sheets

U.S. PATENT DOCUMENTS

| | | | |
|---|---|---|---|
| 2005/0138178 A1* | 6/2005 | Astarabadi | 709/227 |
| 2005/0163077 A1 | 7/2005 | Suda | 370/331 |
| 2005/0255847 A1* | 11/2005 | Han et al. | 455/436 |
| 2006/0025128 A1* | 2/2006 | Lee | 455/432.1 |
| 2006/0258350 A1* | 11/2006 | Roy et al. | 455/435.1 |
| 2008/0051060 A1 | 2/2008 | Lee et al. | 455/411 |

FOREIGN PATENT DOCUMENTS

| | | |
|---|---|---|
| EP | 1124397 A2 | 8/2001 |
| EP | 1 172 969 | 1/2002 |
| EP | 1172969 A2 | 1/2002 |
| JP | 2001-258059 | 9/2001 |
| JP | 2001-258059 A | 9/2001 |
| JP | 2002-026931 | 1/2002 |
| JP | 2002-26931 A | 1/2002 |
| JP | 2003-078535 | 3/2003 |
| JP | 2003-078535 A | 3/2003 |
| JP | 2004-180123 | 6/2004 |
| JP | 2004-180123 A | 6/2004 |
| JP | 2004-222300 | 8/2004 |
| JP | 2004-222300 A | 8/2004 |
| JP | 2005-086623 | 3/2005 |
| JP | 2005-86623 A | 3/2005 |
| WO | 03/088691 | 10/2003 |
| WO | WO 03/088691 A1 | 10/2003 |

OTHER PUBLICATIONS

International Search Report dated Mar. 14, 2006 in corresponding International Application PCT/JP2006/302650 (2 pp).

* cited by examiner

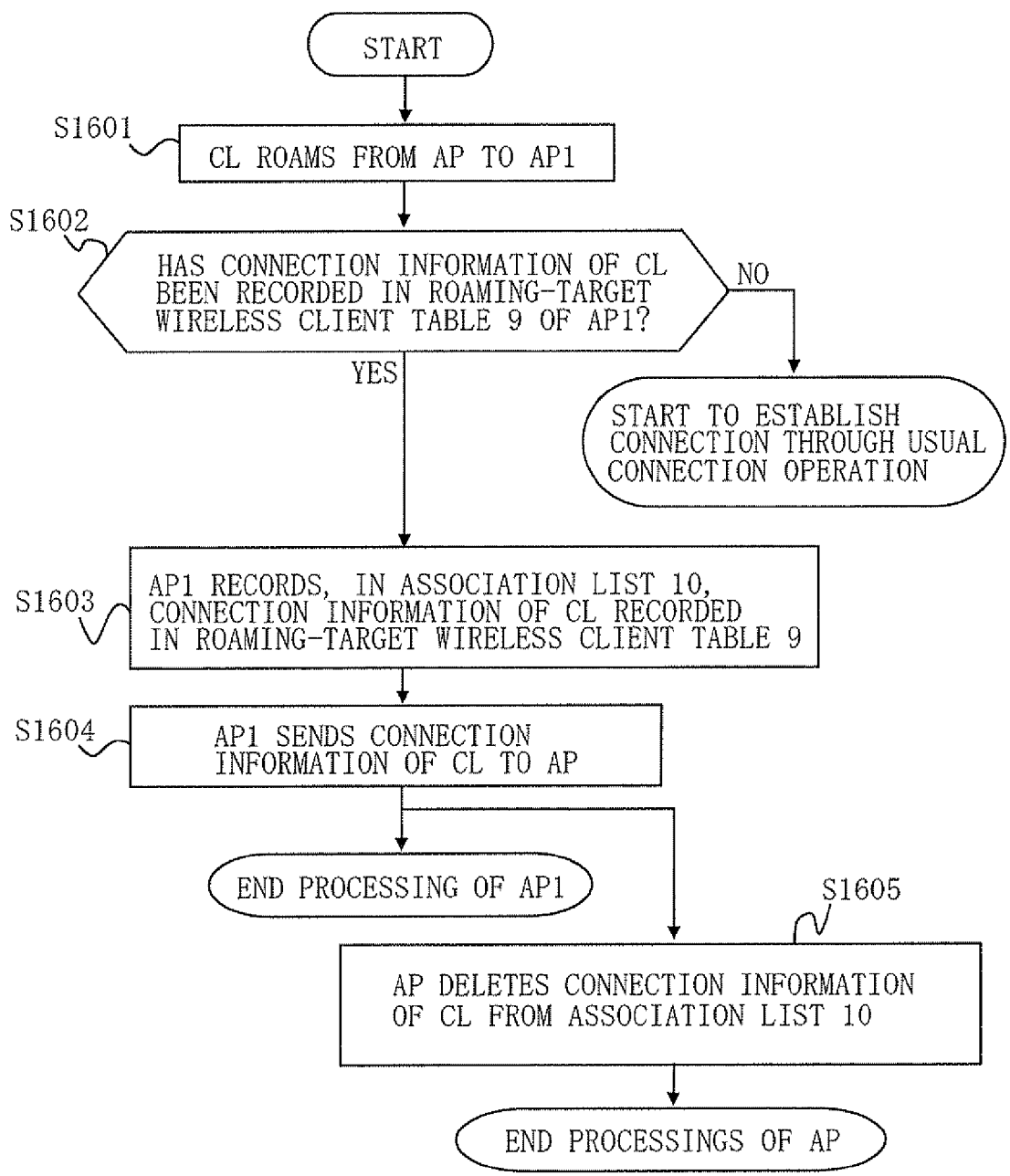

COMMUNICATION DEVICE, WIRELESS COMMUNICATION DEVICE, AND CONTROL METHOD

CROSS-REFERENCE TO RELATED APPLICATIONS

This is a continuation of Application PCT/JP2006/302650 filed on Feb. 15, 2006, now pending, the contents of which are herein wholly incorporated by reference.

BACKGROUND OF DISCLOSURE

The present disclosure relates to a communication device and a wireless communication device.

A wireless local area network (LAN) system includes wireless LAN access points (hereinafter, also simply referred to as "access points") and wireless LAN devices (hereinafter, also referred to as "clients") which can be connected by radio to the wireless LAN access points. In networks such as wireless LANs, access points provide a connection service for clients. Roaming is performed as described below with use of wireless LAN access points and a wireless LAN device (here, roaming means that the wireless LAN device continues communication while moving by disconnecting from one wireless LAN access point and connecting to another wireless LAN access point).

First, the wireless LAN device connects to a wireless LAN access point. Then, the wireless LAN device performs communication via the wireless LAN access point. When the state (for example, the reception sensitivity or the packet rate) of the communication being performed with the connected wireless LAN access point satisfies a roaming start condition, the wireless LAN device detects a roaming-destination wireless LAN access point. Then, the wireless LAN device again connects this time to the roaming-destination wireless LAN access point. Since clients and access points are designed without considering roaming, a long period of time is required for roaming. Therefore, packet loss or packet delay tends to occur during roaming. As a result, such packet loss or packet delay which may occur during roaming causes an instantaneous interruption in sound, frame skipping in moving image, and the like in communications for sounds and moving images, which should be performed in real time. Possible reasons for this problem are described below. In roaming, a client has to disconnect from the currently-connected access point and connect to a roaming-destination access point. Some clients have a strict roaming start condition (in order to maintain the connection to the currently-connected access point for a long period of time), causing packet loss or packet delay when the reception sensitivity or the communication speed is reduced. Further, it takes a period of time to detect a roaming-destination access point.

In the above case, the roaming start condition can be eased. However, when the roaming start condition is eased, a client needs to successively repeat disconnection and connection processing with a plurality of access points, depending on the positional relationship between the client and the access points. When such connection processing is repeated, a radio band may be occupied. In order to solve the problem, a wireless LAN switch allowing high-speed roaming can be used, but it costs as much as tens of thousands of dollars for installation.

[Patent document 1] Japanese Patent Application Laid-Open Publication No. 2002-26931

[Patent document 2] Japanese Patent Application Laid-Open Publication No. 2003-78535

[Patent document 3] Japanese Patent Application Laid-Open Publication No. 2004-180123

SUMMARY

Therefore, with conventional technologies, when a client performs roaming in networks such as wireless LANs, in which access points provide a connection service for clients, it is difficult for the client to instantly switch access points because the client performs the disconnection and connection processing. Further, it is difficult to switch access points at high speed with low cost. It is therefore an object of the present disclosure to allow a client to switch access points at high speed in roaming when a predetermined condition is satisfied, without judging whether a usual condition is satisfied.

In order to solve the above-mentioned problems, the present disclosure provides the following means.

(1) Specifically, the present disclosure provides a communication device that includes an authentication unit that authenticates, when a connection request is received from a wireless communication device, the wireless communication device depending on whether a predetermined authentication condition is satisfied, and a relay unit that relays communication performed by the wireless communication device when the authentication unit successfully authenticates the wireless communication device, including: an information transmission and reception unit receiving connected-terminal information, which includes identification information identifying the wireless communication device whose communication is being relayed, held by other communication devices; a recording unit recording the received connected-terminal information; a judging unit judging, when the connection request is received from the wireless communication device, whether the identification information identifying the wireless communication device is included in the recorded connected-terminal information; and a permitting unit permitting relaying of communication performed by the wireless communication device when the identification information of the wireless communication device is included in the recorded connected-terminal information. In the communication device of the present disclosure, when the connection request is received from the wireless communication device and the identification information of the wireless communication device is included in the connected-terminal information provided by the other communication devices, a process of judging whether the predetermined authentication condition is satisfied is omitted. Therefore, when the connection request is received from the wireless communication device, it is possible to rapidly start to relay communication performed by the wireless communication device.

(2) Further, the communication device of the present disclosure may further include: a receiving unit that receives condition information which includes a predetermined authentication condition from the other communication devices; wherein the judging unit judges whether the condition information received from the other communication devices matches the predetermined authentication condition of the communication device, and the information transmission and reception unit includes a recording control unit recording the connected-terminal information received from the other communication devices when the condition information received from the other communication devices matches the predetermined authentication condition of the communication device. In the communication device of the present disclosure, when the condition information received from the other communication devices matches the predetermined authentication condition of the communication device, the connected-terminal information held by the other communication devices is recorded. Therefore, when the connection request is received from the wireless communication device, it is possible to easily judge whether a judgment about the predetermined authentication condition can be omitted for the wireless communication device.

(3) Further, in the communication device of the present disclosure, the condition information may include identification information identifying the other communication devices, and the information transmission and reception unit may record the identification information identifying the other communication devices when the condition information of the other communication devices matches the predetermined authentication condition of the communication device. In the communication device of the present disclosure, when the condition information received from the other communication devices matches the condition information of the communication device, the identification information identifying the other communication devices is recorded. Therefore, it is possible to recognize the presence of the other communication devices which can rapidly start to relay communication performed by the wireless communication device.

(4) Further, the communication device of the present disclosure may further include a provision unit that provides the recorded identification information identifying the other communication devices, to the wireless communication device whose communication is permitted relaying by the permission unit. In the communication device of the present disclosure, the identification information identifying the other communication devices is provided to the wireless communication device whose communication is permitted. Therefore, the presence of the other communication devices which can rapidly start to relay communication performed by the wireless communication device can be recognized by the wireless communication device.

(5) Further, the communication device of the present disclosure may further include: a receiving unit that receives condition information which includes a predetermined authentication condition from the other communication devices; wherein the judging unit may judge whether the received condition information matches the recorded connected-terminal information, and the information transmission and reception unit may include a transmission control unit that sends, when the received condition information matches the recorded connected-terminal information, the connected-terminal information to the other communication devices, which are the transmission sources of the received condition information. In the communication device of the present disclosure, when the condition information received from the other communication devices matches the recorded connected-terminal information, the connected-terminal information is sent to the other communication devices, which are the transmission sources of the condition information. Therefore, the presence of a wireless communication device for which a judgment about the predetermined authentication condition can be omitted when a connection request is received can be recognized by the other communication devices.

(6) Further, the communication device of the present disclosure may further include another provision unit that provides the received condition information to the wireless communication device whose communication is permitted relaying by the permission unit. In the communication device of the present disclosure, the condition information is provided to the wireless communication device whose communication is permitted. Information used to judge whether the other communication devices can rapidly start to relay communication performed by the wireless communication device can be provided to the wireless communication device.

(7) The present disclosure also provides a wireless communication device that performs communication via a communication device, including: a providing unit providing the communication device with information which includes a predetermined authentication condition when a connection request is sent to the communication device; a reception unit receiving identification information identifying other communication devices from the communication device which has permitted a connection in response to the connection request; a collecting unit collecting communication qualities of information provided by the other communication devices identified by the received identification information identifying the other communication devices, and communication quality of information provided by the communication device which has permitted the connection; a comparing unit comparing the communication qualities of information collected from the other communication devices with the communication quality of information provided by the communication device which has permitted the connection; a determining unit determining, based on a result obtained by the comparing unit, one of the other communication devices which provide information with the communication quality better than the communication quality of information provided by the communication device which has permitted the connection; and a connection request unit sending the connection request to the determined one of the other communication devices. In the wireless communication device of the present disclosure, the connection request is sent to one of the other communication devices which provide information with a communication quality better than the communication quality of information provided by the communication device which currently relays communication. Therefore, since the other communication devices to which the connection request is to be sent are recognized in advance, the connection request can be rapidly sent to the other communication devices, which are destinations of the connection request.

(8) Further, in the wireless communication device of the present disclosure, the other communication devices may have a predetermined authentication condition that matches condition information which includes a predetermined authentication condition held by the communication device for which the connection request has been permitted. In the wireless communication device of the present disclosure, the other communication devices have the predetermined authentication condition that matches the condition information which includes the predetermined authentication condition held by the communication device for which the connection request has been permitted. Therefore, since the other communication devices which can permit the connection request without judging whether the predetermined authentication condition is satisfied are recognized in advance, the connection request can be rapidly sent to the other communication devices, which are destinations of the connection request.

(9) Further, the present disclosure provides a communication device control method including: an authentication step of authenticating, when a connection request is received from a wireless communication device, the wireless communication device depending on whether a predetermined authentication condition is satisfied; a relay step of relaying communication performed by the wireless communication device when the wireless communication device is successfully authenticated in the authentication step; a recording step of recording connected-terminal information which includes identification information identifying the wireless communication device which is successfully authenticated in the authentication step and whose communication is being relayed; an information transmission and reception step of receiving connected-terminal information held by other communication devices; a first judgment step of judging, when the connection request is received from the wireless communication device, whether the identification information identifying the wireless communication device is included in the connected-terminal information held by the other communication devices; and a permission step of permitting relaying of communication performed by the wireless communication device when the identification information of the wireless communication device is included in the connected-terminal information held by the other communication devices. In the communication device control method of the present disclosure, when the connection request is received from the wireless communication device and the identification information of the wireless communication device is included in the connected-terminal information provided by the other communication devices, a judgment about whether the predetermined authentication condition is satisfied is omitted. Therefore, when the connection request is received from the wireless communication device, it is possible for the communication device to rapidly start relaying communication performed by the wireless communication device.

(10) Further, the communication device control method of the present disclosure may further include: a reception step of receiving condition information which includes a predetermined authentication condition from the other communication devices; and a second judgment step of judging whether the condition information received from the other communication devices matches the predetermined authentication condition of the communication device, and the information transmission and reception step may include a recording control step of recording the connected-terminal information held by the other communication devices when the condition information of the other communication devices matches the predetermined authentication condition of the communication device. In the communication device control method of the present disclosure, when the condition information received from the other communication devices matches the predetermined authentication condition of the communication device, the connected-terminal information held by the other communication devices is recorded. Therefore, when the connection request is received from the wireless communication device, it is possible to easily judge whether a judgment about the predetermined authentication condition can be omitted for the wireless communication device.

According to the present disclosure, when a predetermined condition is satisfied, a client can switch access points at high speed because the client does not need to judge whether a usual condition is satisfied.

BRIEF DESCRIPTION OF THE DRAWINGS

FIG. 16 is a flowchart showing processing in which the access points each update their own association lists 10 when roaming is performed between the access points in FIG. 15.

Hereinafter, wireless devices according to the best mode for carrying out the present disclosure (hereinafter, referred to as embodiments) will be described with reference to the accompanying drawings. Configurations of the embodiments to be described below are shown as examples and the present disclosure is not limited to the configurations of the embodiments.

FIRST EMBODIMENT

Hereinafter, a system according to the embodiment will be described with reference to FIGS. 1 to 9.

<<System Principle>>

The system according to the embodiment includes a plurality of wireless LAN access points (corresponding to communication devices) and a plurality of wireless LAN clients (corresponding to wireless communication devices). Each of the wireless LAN access points (hereinafter, also simply referred to as "access points") has a service set identifier (SSID), a unique media access control address (MAC address) used in a wireless LAN, a unique MAC address used in a wired LAN, and security settings such as wired equivalent privacy (WEP) and Wi-Fi protected access (WPA). The WEP and the WPA are encryption system standards for wireless LANs. The SSID and the security settings are used to judge whether the wireless LAN client (hereinafter, also simply referred to as "client") can be connected to the access point. Further, the MAC address is used to identify an individual access point.

Each client has a unique MAC address used in a wireless LAN, an SSID, security settings, and an association ID. When a client connects to an access point, the access point can use the association ID to identify the client.

The access points are connected to each other by a LAN cable 6. Communication is performed between the access points via the LAN cable 6. For example, Ethernet (registered trademark) can be used for a communication network which connects the access points. To perform communication by using a wired LAN, an access point sends packets which record its MAC address used in a wired LAN (hereinafter, referred to as "wired MAC address") and its MAC address used in a wireless LAN (hereinafter, referred to as "wireless MAC address"), to other access points.

To perform communication by using a wireless LAN, a client sends a probe request which includes its MAC address used in a wireless LAN (hereinafter, referred to as "wireless MAC address") and its SSID, to an access point. The probe request is also used when the client currently connected to an access point checks the connection to the access point.

<Access Point Configuration Diagram>

Figure 1:
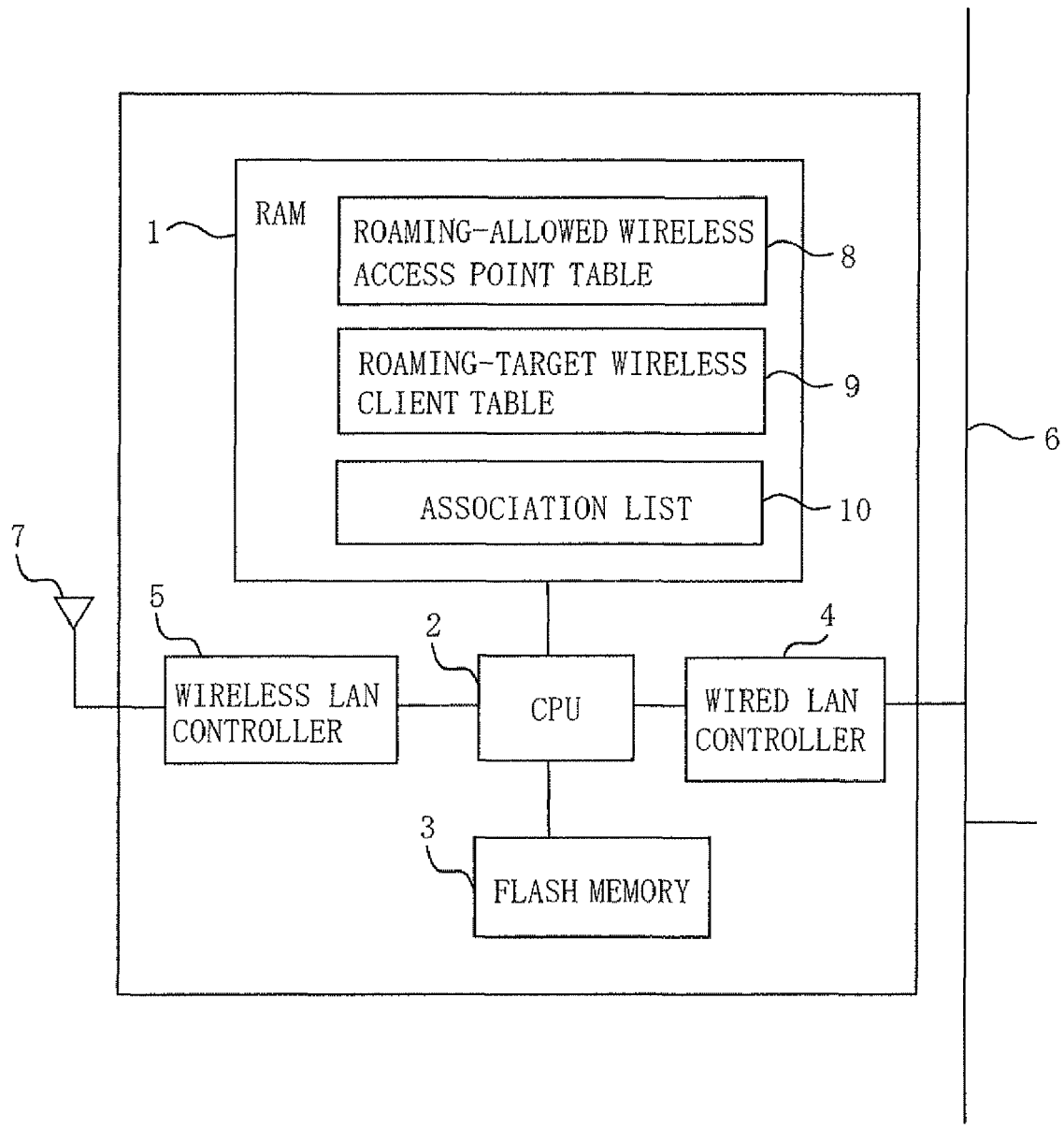
FIG. 1 is a block diagram showing a configuration of an access point.

FIG. 1 is a block diagram showing a configuration of an access point. In FIG. 1, the access point includes a random access memory (RAM) 1, a central processing unit (CPU) 2, a flash memory 3, a wired LAN controller 4, and a wireless LAN controller 5. Communication is performed between access points via the LAN cable 6. The wireless LAN controllers has a wireless LAN antenna 7.

The random access memory 1 is a storage medium to be used as a work area when the central processing unit 2 executes a wireless LAN control program. In the random access memory 1, a roaming-allowed wireless access point table 8, a roaming-target wireless client table 9, and an association list 10 are generated as areas to manage data used when the control program is executed. The roaming-allowed wireless access point table 8 is recorded with wireless MAC addresses of other access points and setting information (security settings (such as WEP and WPA) and SSID) of the other access points. The wireless MAC addresses of other access points corresponds to "identification information identifying other communication devices". Further, the roaming-allowed wireless access point table 8 is recorded with the wireless MAC addresses of other access points and the setting information of the other access points in association with each other.

The roaming-target wireless client table 9 is recorded with connection information (for example, the wireless MAC address and the association ID) of a client which has setting information identical to the setting information of the own access point. The connection information of the client corresponds to "identification information identifying the wireless communication device". The connection information of the client which has setting information identical to the setting information of the own access point corresponds to "connected-terminal information".

The association list 10 is recorded with setting information of a client which has been connected to the own access point and connection information of the client which has been connected to the own access point. Further, the random access memory 1 is recorded with the wireless MAC addresses of other access points, used for the access point to perform wired-LAN communication with the other access points.

The central processing unit 2 executes the wireless LAN control program (for example, firmware and driver) recorded in the flash memory 3. The central processing unit 2 uses the random access memory 1 as a temporary storage medium during execution of the program. The central processing unit 2 executes the control program to perform the following processings.

<<Relay Processing>>

The central processing unit 2 receives a probe request sent from a client, via the wireless LAN controller 5. The central processing unit 2 refers to the SSID to judge whether the probe request is a connection request made to the own access point. When it is judged that the probe request is not a connection request made to the own access point, the central processing unit 2 does not reply to the client, which has sent the probe request. On the other hand, when it is judged that the probe request is a connection request made to the own access point, the central processing unit 2 sends a probe response to the client, which has sent the probe request, by using the wireless MAC address included in the probe request.

The probe response includes the wireless MAC address of the transmission-source access point. After sending the probe response, the central processing unit 2 receives an authentication request from the transmission source of the probe request. The authentication request includes the security settings of the client. After receiving the authentication request, the central processing unit 2 sends an authentication response to the client, which is the transmission source of the authentication request (the central processing unit 2 corresponds to "an authentication unit").

After sending the authentication response, the central processing unit 2 receives an association request from the transmission source of the authentication request. The association request includes the association ID of the client. After receiving the association request, the central processing unit 2 sends an association response to the client, which is the transmission source of the association request. In this way, the central processing unit 2 permits the client to connect to the own access point. The central processing unit 2, which has permitted the client to connect to the own access point, relays communication between the client and the network connected via the LAN cable 6 (the central processing unit 2 corresponds to "a relay unit").

To relay communication between the client and the network connected via the LAN cable 6 by using the wired LAN controller 4, when connection information of the client has not been recorded in the association list 10, the central processing unit 2 records the connection information of the client in the association list 10.

The central processing unit 2 receives the connection information of the client recorded in packets sent from the client, via the wireless LAN controller 5. When the client has been connected to the own access point, the central processing unit 2 records the connection information of the client in the roaming-target wireless client table 9 (the central processing unit 2 corresponds to "a recording unit").

Further, after recording the connection information of the client in the roaming-target wireless client table 9, the central processing unit 2 sends packets which record the connection information of the client to another access point which has setting information identical to the setting information of the own access point via the wired LAN controller 4. Further, the central processing unit 2 receives packets from another access point which has setting information identical to the setting information of the own access point via the wired LAN controller 4 (the central processing unit 2 corresponds to "an information transmission and reception unit"). The received packets include connection information of a client recorded in the roaming-target wireless client table 9 of the another access point.

When a connection request is received from a client, the central processing unit 2 judges whether the connection information of the client has been recorded in the roaming-target wireless client table 9 of the own access point (the central processing unit 2 corresponds to "a judging unit").

When it is judged that the connection information of the client has been recorded in the roaming-target wireless client table 9 of the own access point, the central processing unit 2 relays communication performed by the client to the LAN cable 6 via the wired LAN controller 4 (the central processing unit 2 corresponds to "a permitting unit"). The processing is called relay processing.

The central processing unit 2 receives, via the wired LAN controller 4, packets which record the setting information and the wireless MAC address of another access point, sent from the another access point (the central processing unit 2 corresponds to "a receiving unit"). Further, the central processing unit 2 extracts the setting information and the wireless MAC address of the another access point from the packets received via the wired LAN controller 4.

Further, the central processing unit 2 judges whether the setting information of the another access point, recorded in the packets received via the wired LAN controller 4, is identical to the setting information of the own access point (the central processing unit 2 corresponds to "a judging unit").

When it is judged that the setting information of the another access point is identical to the setting information of the own access point, the central processing unit 2 records connection information recorded in the packets received from the another access point via the wired LAN controller 4, in the roaming-target wireless client table 9. The connection information recorded in the packets is connection information of a client recorded in the roaming-target wireless client table 9 of the another access point.

When it is judged that the setting information of the another access point is not identical to the setting information of the own access point, the central processing unit 2 discards the connection information recorded in the packets received via the wired LAN controller 4. On the other hand, when it is judged through the judgment that the setting information of the another access point is identical to the setting information of the own access point, the central processing unit 2 records the wireless MAC address of another access point recorded in the packets received via the wired LAN controller 4, in the roaming-allowed wireless access point table 8. Then, the central processing unit 2 sends acknowledgment (ACK) packets which record the wireless MAC address of the own access point to the another access point indicated by the recorded wireless MAC address, via the wired LAN controller 4.

When the ACK packets sent from the another access point is received via the wired LAN controller 4, the central processing unit 2 records the wireless MAC address of the another access point recorded in the ACK packets, in the roaming-allowed wireless access point table 8. When it is judged through the judgment that the setting information of the another access point is not identical to the setting information of the own access point, the central processing unit 2 discards the wireless MAC address of the another access point recorded in the ACK packets received via the wired LAN controller 4 (the central processing unit 2 corresponds to "a recording control unit").

Further, the central processing unit 2 sends packets which record the wireless MAC address of another access point recorded in the roaming-allowed wireless access point table 8 to a client connected to the own access point, via the wireless LAN controller 5 (the central processing unit 2 corresponds to "a provision unit"). The central processing unit 2 records the setting information and the connection information of a client which has roamed to the own access point, in the association list 10.

Further, the central processing unit 2 sends packets which record the connection information of the client which has roamed to the own access point, to another access point to which the client was connected before, via the wired LAN controller 4. With this operation, an access point can notify another access point of a client which has roamed from the another access point to the own access point.

Further, the central processing unit 2 receives packets which record the connection information of a client from the another access point via the wired LAN controller 4. When the connection information of the client, recorded in the received packets, has been recorded in the association list 10 of the own access point, the central processing unit 2 recognizes that the client has been disconnected from the own access point.

Further, when packets which record the connection information of a client is received from the another access point via the wired LAN controller 4 and the connection information of the client has been recorded in the association list 10, the central processing unit 2 deletes the connection information of the client recorded in the association list 10.

The flash memory 3 includes the wireless LAN control program to be executed by the central processing unit 2. The wired LAN controller 4 is connected to other access points via the LAN cable 6. The wired LAN controller 4 receives packets from other access points. Further, the wired LAN controller 4 sends packets to other access points via the LAN cable 6.

The wireless LAN antenna 7 receives radio signals from clients. Further, the wireless LAN antenna 7 sends radio signals to clients.

<Client Configuration Diagram>

Figure 2:
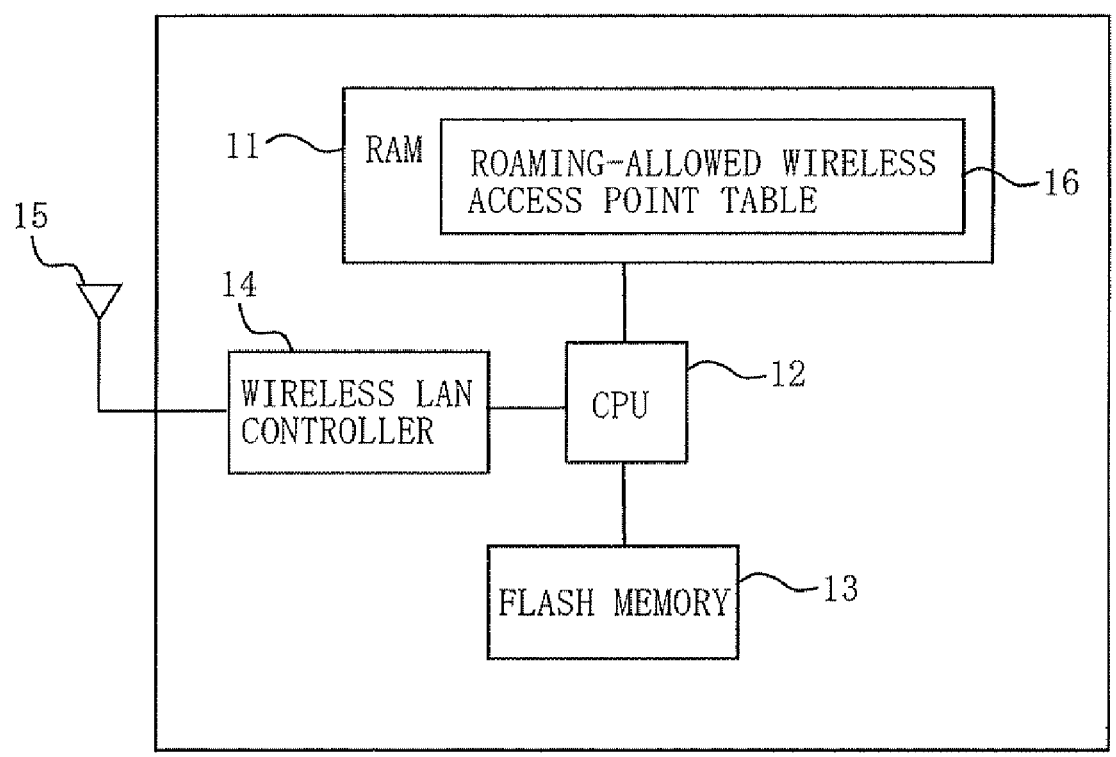
FIG. 2 is a block diagram showing a configuration of a client.

FIG. 2 is a block diagram showing a configuration of a client. In FIG. 2, the client includes a random access memory (RAM) 11, a central processing unit (CPU) 12, a flash memory 13, and a wireless LAN controller 14. The wireless LAN controller 14 has a wireless LAN antenna 15.

The random access memory 11 is a storage medium to be used as a work area when the central processing unit 12 executes a wireless LAN control program. In the random access memory 11, a roaming-allowed wireless access point table 16 is generated as an area to manage data used when the control program is executed. The roaming-allowed wireless access point table 16 is recorded with the wireless MAC address of an access point which has setting information identical to the setting information of the own client. Further, the roaming-allowed wireless access point table 16 is recorded with a value indicating a communication quality of the access point which has setting information identical to the setting information of the own client.

The central processing unit 12 executes the wireless LAN control program (for example, firmware and driver) recorded in the flash memory 13. The central processing unit 12 uses the random access memory 11 as a temporary storage medium during execution of the program. In the embodiment, the client means a mobile terminal that performs communication while moving.

In the first embodiment, the client can also be realized by a personal computer, a personal computer which includes a wireless LAN module, or a personal computer to which a wireless LAN card is inserted. In the first embodiment, when the client is realized by a personal computer, the flash memory 13 shown in FIG. 2 can be replaced with an external storage device such as a hard disk. Further, in the first embodiment, when the client is realized by a personal computer which includes a wireless LAN module or by the personal computer to which the wireless LAN card is inserted, the wireless LAN module or the wireless LAN card includes the wireless LAN controller 14 and the wireless LAN antenna 15, which are shown in FIG. 2, and an erasable programmable read only memory (EEPROM) (not shown).

Further, the personal computer which includes the wireless LAN module or the personal computer to which the wireless LAN card is inserted includes the random access memory 11, the central processing unit 12, and the flash memory 13, shown in FIG. 2. Further, the flash memory 13 shown in FIG. 2 can be replaced with an external storage device such as a hard disk.

The central processing unit 12 executes the control program to perform the following processings.

<<Information Providing Processing>>

The central processing unit 12 broadcasts a probe request via the wireless LAN controller 14 at predetermined time intervals measured by a timer included in the own client. The central processing unit 12 each can receive probe responses from a plurality of access points which can be connected to the own client, via the wireless LAN controller 14. Each probe response includes the wireless MAC address for identifying the each access point.

When a probe response is received, the central processing unit 12 recognizes the presence of a connectable access point. When probe responses are received from the plurality of access points, the central processing unit 12 specifies an access point which has the best communication quality for the own client (for example, an access point which sends the strongest signal), based on the communication quality (for example, received-signal strength) obtained when each probe response is received. The central processing unit 12 sends an authentication request to the specified access point via the wireless LAN controller 14 by using the wireless MAC address of the specified access point. The authentication request includes security settings.

The central processing unit 12 receives an authentication response from the access point via the wireless LAN controller 14. Upon reception of the authentication response, the central processing unit 12 sends an association request to the access point via the wireless LAN controller 14. The association request includes the association ID. The central processing unit 12 receives an association response from the access point via the wireless LAN controller 14. In this way, the central processing unit 12 can connect to the access point (the central processing unit 12 corresponds to "a providing unit"). The processing is called information providing processing.

Further, the central processing unit 12 receives, from the access point connected to the own client, packets which record the wireless MAC address of another access point via the wireless LAN controller 14 (the central processing unit 12 corresponds to "a reception unit").

Further, when the packets which record the wireless MAC address of the another access point is received from the access point connected to the own client via the wireless LAN controller 14, the central processing unit 12 records the wireless MAC address of the another access point in the roaming-allowed wireless access point table 16.

Further, while performing communication with the access point connected to the own client, the central processing unit 12 inquires the communication quality of the access point, of the wireless LAN controller 14. The central processing unit 12 receives a value indicating the communication quality of the access point from the wireless LAN controller 14 and records the value in the roaming-allowed wireless access point table 16.

Further, the central processing unit 12 sends broadcast packets at regular intervals via the wireless LAN controller 14. The central processing unit 12 receives abroad response sent by an access point which has received the broadcast packets. Upon reception of the broad response, the central processing unit 12 inquires the communication quality of the access point which has sent the broad response, of the wireless LAN controller 14. The central processing unit 12 receives a value indicating the communication quality of the access point from the wireless LAN controller 14 (the central processing unit 12 corresponds to "a collecting unit").

When the wireless MAC address of the access point has been recorded in the roaming-allowed wireless access point table 16, the central processing unit 12 records the received value indicating the communication quality of the access point in the roaming-allowed wireless access point table 16.

Further, the central processing unit 12 receives a beacon sent by the access point, via the wireless LAN controller 14. Upon reception of the beacon, the central processing unit 12 inquires the communication quality of the access point which has sent the beacon, of the wireless LAN controller 14. Then, the central processing unit 12 receives a value indicating the communication quality of the access point from the wireless LAN controller 14 (the central processing unit 12 corresponds to "a collecting unit"). When the wireless MAC address of the access point has been recorded in the roaming-allowed wireless access point table 16, the central processing unit 12 records the received value indicating the communication quality of the access point in the roaming-allowed wireless access point table 16.

<<Communication Quality Comparing Processing>>

The central processing unit 12 compares the value indicating the communication quality of the access point received from the wireless LAN controller 14 with the value indicating the communication quality of the access point connected to the own client. Further, the central processing unit 12 compares the value indicating the communication quality of the access point indicated by the wireless MAC address recorded in the roaming-allowed wireless access point table 16 with the value indicating the communication quality of the access point connected to the own client (the central processing unit 12 corresponds to "a comparing unit"). The processing is called communication quality comparing processing.

<<Connection Request Processing>>

The central processing unit 12 determines an access point of which a value indicating the communication quality is better than the value indicating the communication quality of the access point connected to the own client through the comparison (the central processing unit 12 corresponds to "a determining unit"). In this case, the central processing unit 12 determines an access point of which a value indicating the communication quality is the largest among access points indicated by wireless MAC addresses recorded in the roaming-allowed wireless access point table 16.

The central processing unit 12 sends a probe request to the determined access point via the wireless LAN controller 14 (the central processing unit 12 corresponds to "a connection request unit"). The processing is called connection request processing.

The central processing unit 12 has the timer to measure a predetermined time. The flash memory 13 includes the wireless LAN control program to be executed by the central processing unit 12. The wireless LAN antenna 15 receives radio signals from the access points. Further, the wireless LAN antenna 15 sends radio signals to the access points.

<<Operation Example>>

<Operation (Processing) Example of Access Point>

Figure 3:
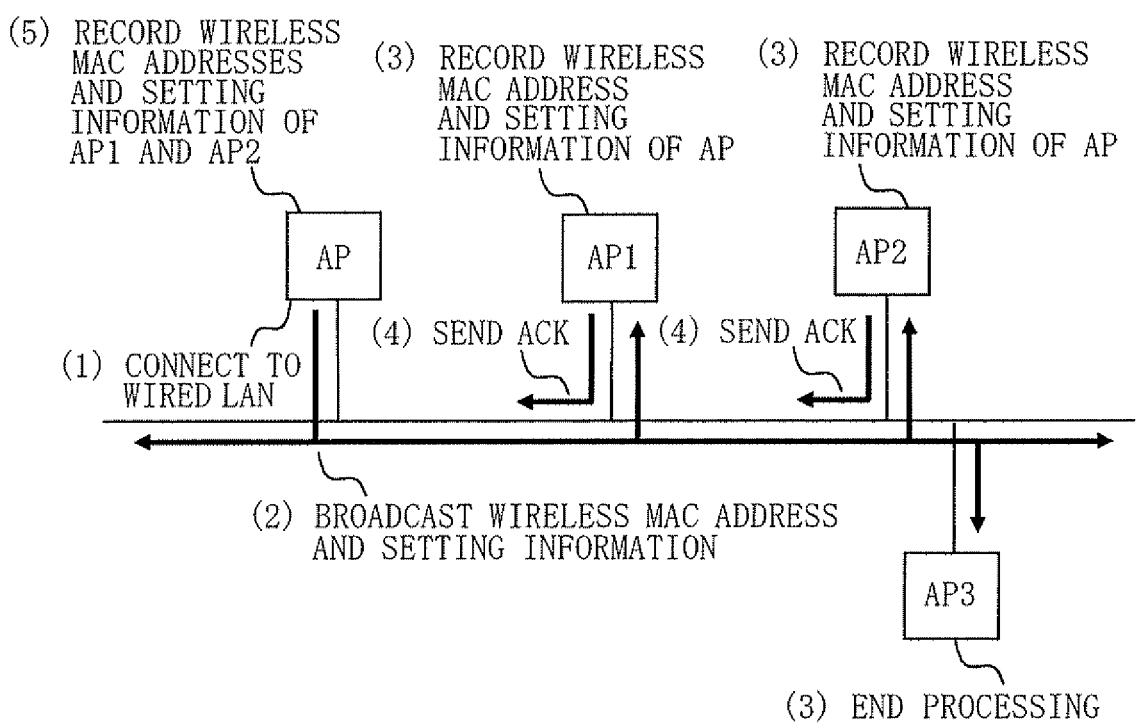
FIG. 3 is a schematic diagram of an operation in which an access point detects and records other access points which have setting information identical to setting information of the access point.

FIG. 3 is a schematic diagram of an operation in which an access point detects and records other access points which have setting information identical to setting information of the access point. FIG. 3 shows an example in which an access point AP (hereinafter, referred to as AP), an access point AP1 (hereinafter, referred to as AP1), and an access point AP2 (hereinafter, referred to as AP2), which have identical setting information, and an access point AP3 (hereinafter, referred to as AP3) which does not have identical setting information are included in a wired LAN network. FIG. 3 just shows an example and the number of access points is not limited to that shown in the example.

It is assumed here that having identical setting information means having completely identical setting information or having partially identical setting information. For example, when an identical SSID is specified for the AP and the AP1, WEP and WPA are specified for the AP, and WPA is specified for the AP1, the AP and the AP1 have identical WPA for the security settings. In this case, the AP and the AP1 have identical SSID and WPA in the setting information, which means the pieces of setting information are partially identical. Therefore, it is assumed that the AP and the AP1 have identical setting information.

The AP is connected to the wired LAN network. The AP broadcasts packets which record the wired MAC address, the wireless MAC address, and the setting information of the own access point to the access points (in this case, AP1, AP2, and AP3) connected to the wired LAN network. The setting information includes security settings (such as WEP and WPA) and the SSID. The AP1, the AP2, and the AP3 each receive the packets sent from the AP, and compare the setting information recorded in the packets with the setting information of the own access point. The AP1 and the AP2, which have setting information identical to the setting information of the AP, each record the wireless MAC address and the setting information of the AP in their own roaming-allowed wireless access point table 8.

On the other hand, the AP3, which does not have identical setting information, ends the processing. The AP1 and the AP2 each send ACK packets to the transmission-source AP. The ACK packets are recorded with the wired MAC address, the wireless MAC address, and the setting information of the corresponding access point, the AP1 or the AP2. In this way, the AP, connected to the wired LAN network, can detect the AP1 and the AP2, which are connected to the wired LAN network and have setting information identical to the setting information of the AP. Further, the AP records the wireless MAC addresses and the setting information of the AP1 and the AP2, which have sent back the ACK packets, in the roaming-allowed wireless access point table 8, and ends the processing.

Figure 4:
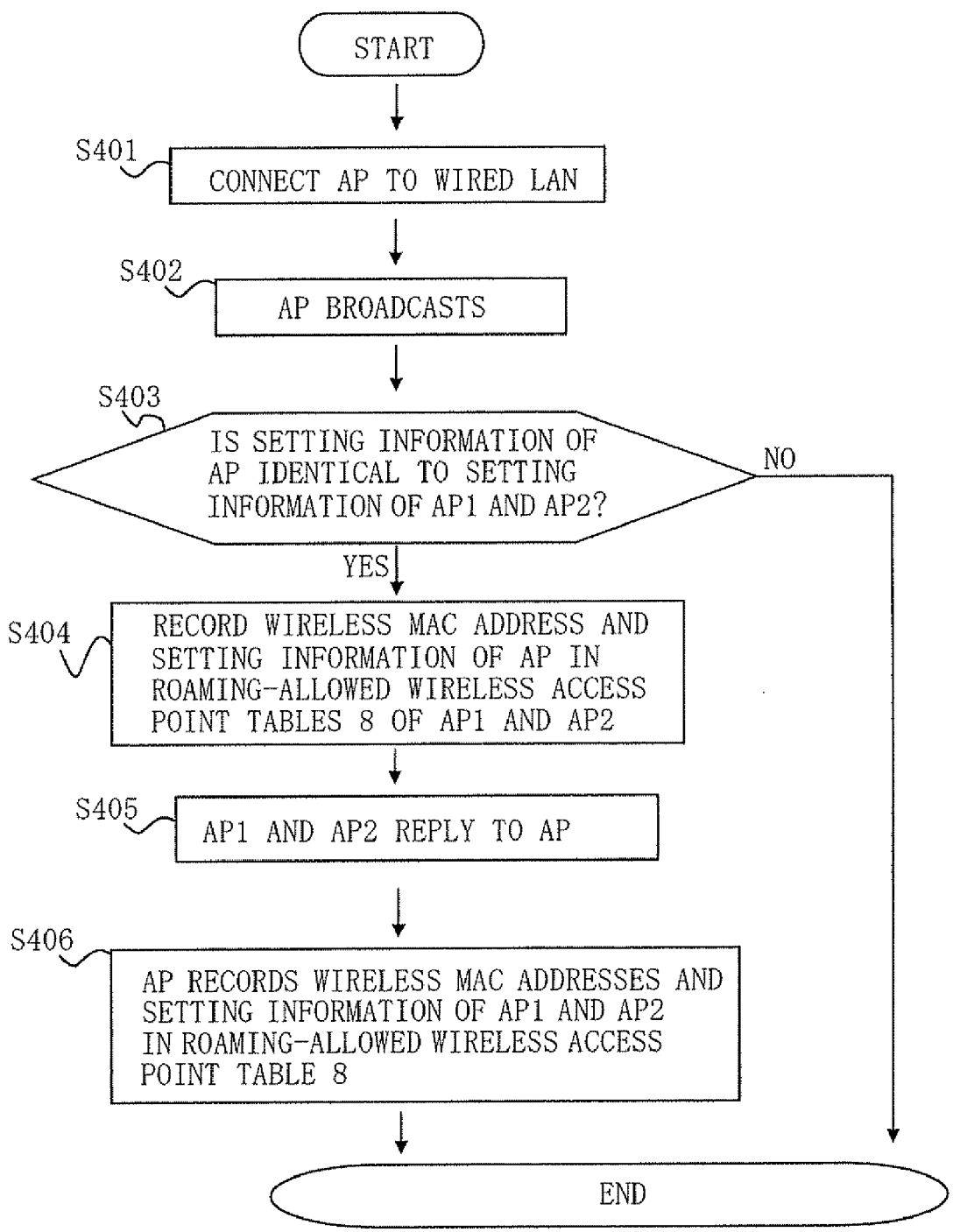
FIG. 4 is a flowchart showing processing in which the access point shown in FIG. 3 detects and records other access points which have setting information identical to setting information of the access point.

FIG. 4 is a flowchart showing processing in which the access point shown in FIG. 3 detects and records other access points which have setting information identical to the setting information of the access point. First, the AP is connected to the wired LAN network (S401). Next, the AP broadcasts packets which record the wired MAC address, the wireless MAC address, and the setting information of the AP (S402). Next, the AP1 and the AP2 each compare the setting information recorded in the packets received from the AP with the setting information of the own access point (S403). When the setting information recorded in the packets received from the AP is not identical to the setting information of the own access point, the AP1 and the AP2 each end the processing.

On the other hand, when the setting information recorded in the packets received from the AP is identical to the setting information of the own access point, the AP1 and the AP2 each record the wireless MAC address and the setting information of the AP in their own roaming-allowed wireless access point table 8 (S404). It is assumed that having identical setting information means having completely identical setting information or having partially identical setting information, as described above with reference to FIG. 3.

Next, the AP1 and the AP2 each send ACK packets to the AP, which is the transmission source of the packets (S405) The AP records the wireless MAC addresses and the setting information of the AP1 and the AP2, which have sent back the ACK packets, in the roaming-allowed wireless access point table 8 of the AP (S406). In this way, an access point can detect another access point which has identical setting information and record it in the roaming-allowed wireless access point table 8 of the own access point.

Figure 5:
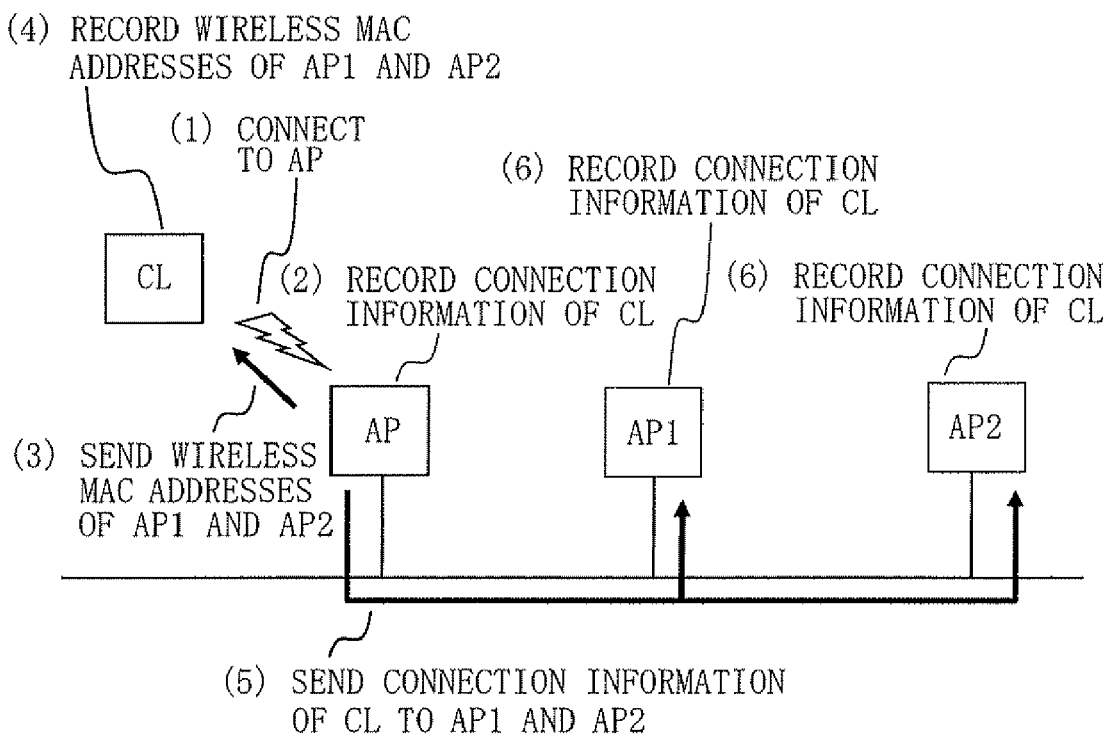
FIG. 5 is a schematic diagram of an operation to connect a client to an access point.

FIG. 5 is a schematic diagram of an operation to connect the client to the access point. FIG. 5 shows an example in which the access point AP (hereinafter, referred to as AP), the access point AP1 (hereinafter, referred to as AP1), the access point AP2 (hereinafter, referred to as AP2), and a client (hereinafter, referred to as CL), which have identical setting information, are included in a network. FIG. 5 just shows an example, and the number of access points or the number of clients is not limited to that shown in the example. In FIG. 5, the AP has completed an operation to detect and record other access points which have identical setting information (the operation of FIG. 3 in which the access point detects and records other access points which have setting information identical to the setting information of the access point).

The CL performs a connection operation to connect to the AP via a wireless LAN. The connection operation is started when the CL broadcasts a probe request. The connection operation is performed between the CL and an access point which has received the probe request (here, the AP). Specifically, the AP sends a probe response to the CL, which has sent the probe request. When the probe response is received, the CL recognizes the presence of a connectable access point (here, the AP).

Upon reception of the probe response, the CL sends an authentication request to the AP. When the authentication request is received, the AP sends an authentication response to the CL. When the authentication response is received, the CL sends an association request to the AP. Upon reception of the association request, the AP sends an association response to the CL. When the connection operation is completed between the CL and the AP, this means that a connection is established. When a connection has been established, the CL records the wireless MAC address of the AP in the roaming-allowed wireless access point table 16. Further, the AP records the connection information and the setting information of the CL in the association list 10. Further, the AP records the connection information of the CL, which has been connected to the AP, in the roaming-target wireless client table 9.

The AP sends, to the CL, packets which record a wireless MAC addresses recorded in the roaming-allowed wireless access point table 8 of the AP. The CL receives the packets sent from the AP. In FIG. 5, the wireless MAC addresses recorded in the packets correspond to the wireless MAC addresses of the AP1 and the AP2.

The CL records information received from the AP in the roaming-allowed wireless access point table 16 of the CL. In FIG. 5, the information to be recorded corresponds to the wireless MAC addresses of the AP1 and the AP2. When the CL roams to the AP1 or the AP2, the wireless MAC address of the corresponding access point, the AP1 or the AP2, recorded in the roaming-allowed wireless access point table 16 of the CL is used.

At this time, it is assumed that a connection to the AP1 or the AP2, whose wireless MAC address is recorded in the roaming-allowed wireless access point table 16 of the CL, has already been established. Specifically, after the connection to the AP is established, the CL receives the wireless MAC addresses of the AP1 and the AP2 and records the wireless MAC addresses in the roaming-allowed wireless access point table 16. Then, the CL can recognize the AP1 and the AP2, which have setting information identical to the setting information of the CL, by referring to the roaming-allowed wireless access point table 16.

The AP sends the connection information of the CL to the AP1 and the AP2, recorded in the roaming-allowed wireless access point table 8 of the AP. When the connection information of the CL is received, the AP1 and the AP2 each record the connection information of the CL in their own roaming-target wireless client table 9.

When the CL roams to the AP1 or the AP2, which is an access point different from the AP, the CL sends a probe request to the corresponding access point, the AP1 or the AP2, and receives a probe response from the corresponding access point, the AP1 or the AP2. Since the CL has already recognized the AP1 and the AP2 having setting information identical to the setting information of the CL, the CL can establish a connection to the AP1 or the AP2 when receiving the probe response from the AP1 or the AP2, without sending an authentication request, receiving an authentication response, sending an association request, and receiving an association response.

Figure 6:
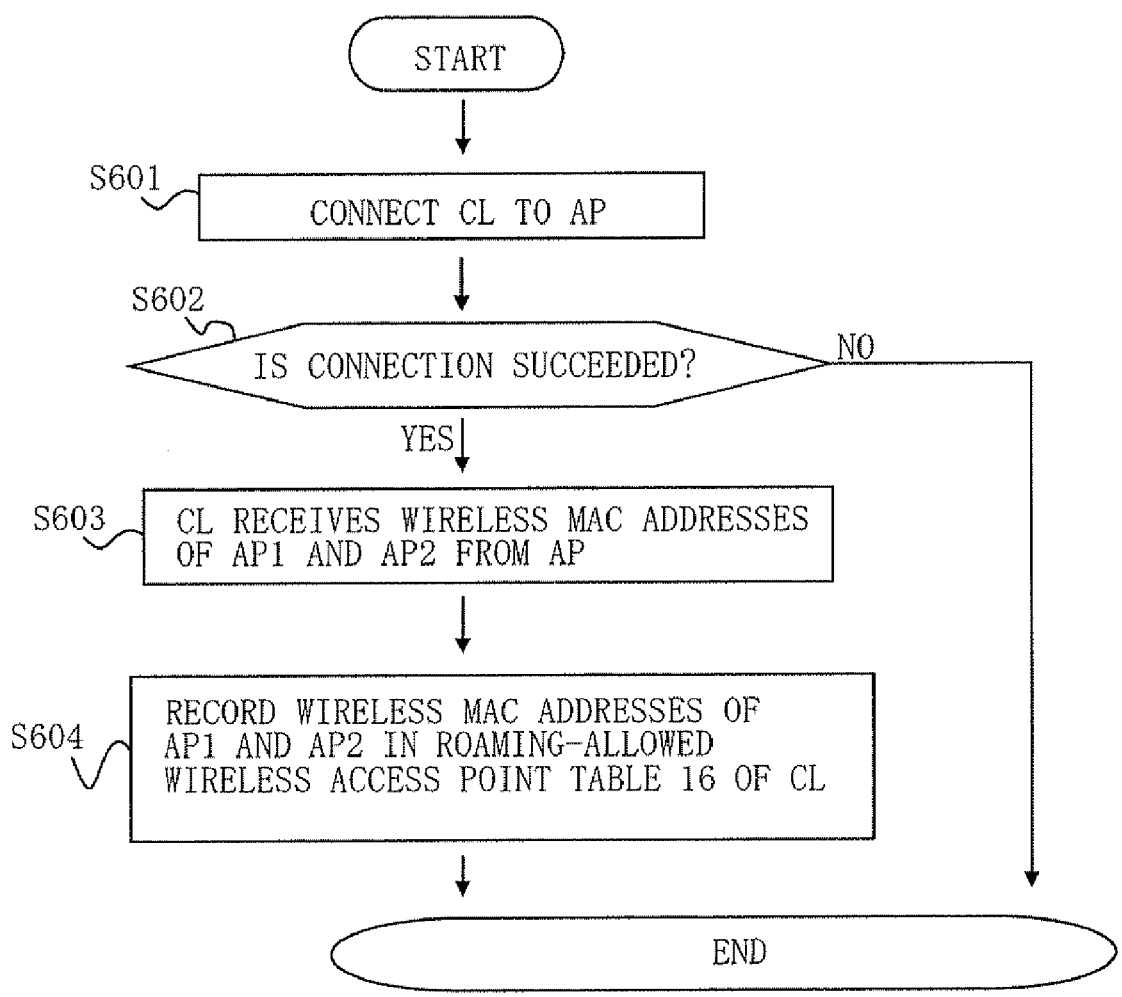
FIG. 6 is a flowchart showing processing in which the client shown in FIG. 5 updates a roaming-allowed wireless access point table 16.

FIG. 6 is a flowchart showing processing in which the client shown in FIG. 5 updates the roaming-allowed wireless access point table 16.

The CL performs a connection operation to connect to the AP (S601). When a connection has not been established, the processing ends. On the other hand, when a connection has been established, a process in Step S603 is performed (S602). The CL receives, from the AP, information on the wireless MAC addresses of the AP1 and the AP2 recorded in the roaming-allowed wireless access point table 8 of the AP (S603).

Next, the CL records the wireless MAC addresses of the AP1 and the AP2 in the roaming-allowed wireless access point table 16 of the CL (S604). The CL ends the processing of updating the roaming-allowed wireless access point table 16. With this processing, it is assumed that a connection to the AP1 or the AP2, recorded in the roaming-allowed wireless access point table 16 of the CL, has already been established. When the CL roams to the AP1 or the AP2, which is an access point different from the AP, a connection can be established at high speed.

Figure 7:
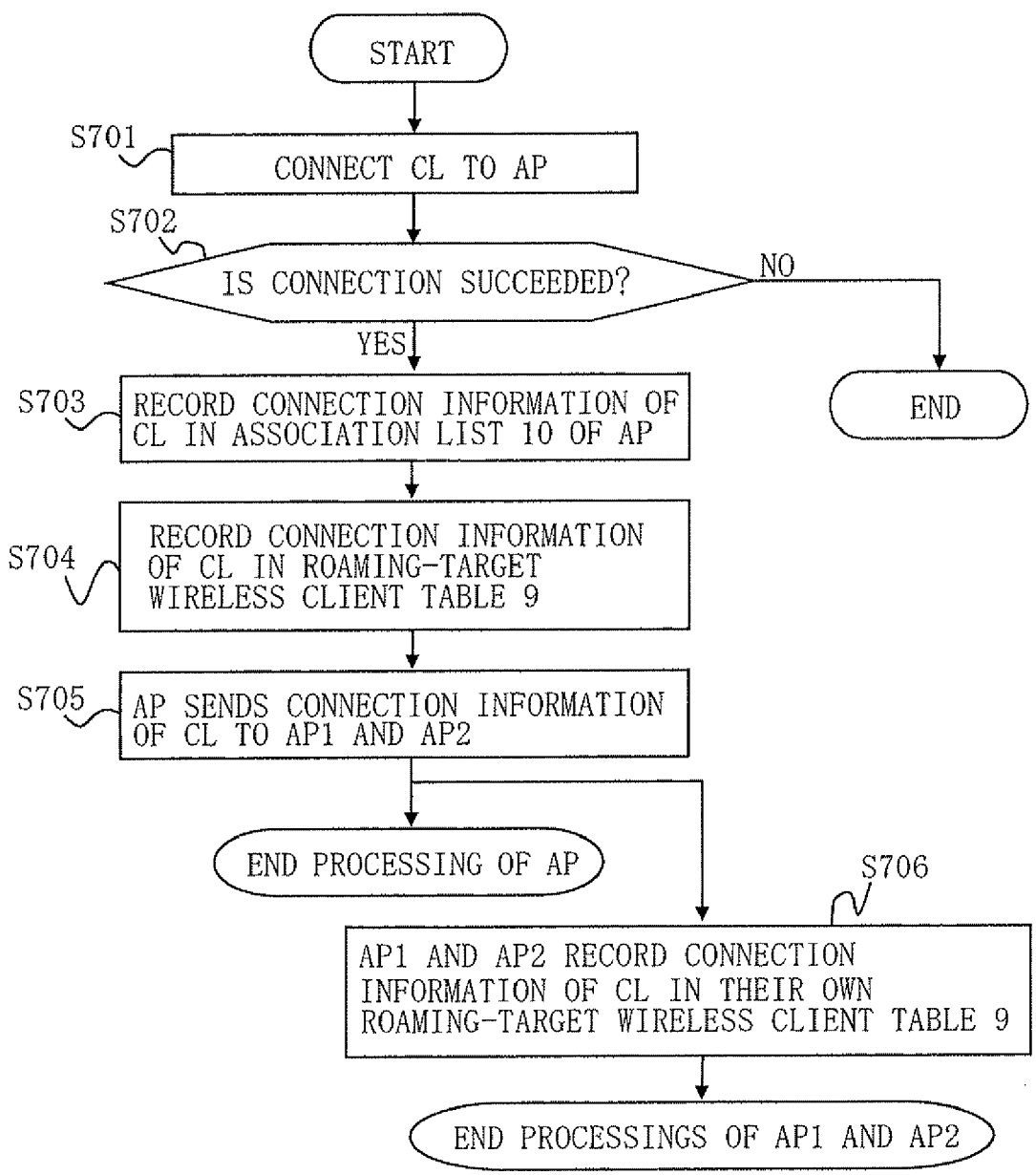
FIG. 7 is a flowchart showing processing in which the access points shown in FIG. 5 each update their own roaming-target wireless client table 9.

FIG. 7 is a flowchart showing processing in which the access point shown in FIG. 5 updates the roaming-target wireless client table 9.

The CL performs a connection operation to connect to the AP (S701). When a connection has not been established, the processing ends. On the other hand, when a connection has been established, a process in Step S703 is performed (S702). The AP records the connection information of the CL, which has been connected to the AP, in the association list 10 of the AP (S703). Next, the AP records the connection information of the CL, which has been connected to the AP, in the roaming-target wireless client table 9 (S704). The connection information corresponds, for example, to the wireless MAC address or the association ID of the CL. However, since the connection information is used to identify a client, the connection information is not limited to the wireless MAC address or the association ID of the CL, or the like.

Next, the AP uses the wireless MAC addresses recorded in the roaming-allowed wireless access point table 8 of the AP to send the connection information of the CL to the corresponding access points. In FIG. 5, the connection information of the CL is sent to the AP1 and the AP2 (S705). The AP ends the processing of updating the roaming-target wireless client table 9. Next, the AP1 and the AP2, which have received the connection information of the CL, each record the connection information of the CL in their own roaming-target wireless client table 9 (S706). The AP1 and the AP2 each end the processing of updating their own roaming-target wireless client table 9. As described above, an access point can update the roaming-target wireless client table 9.

Figure 8:
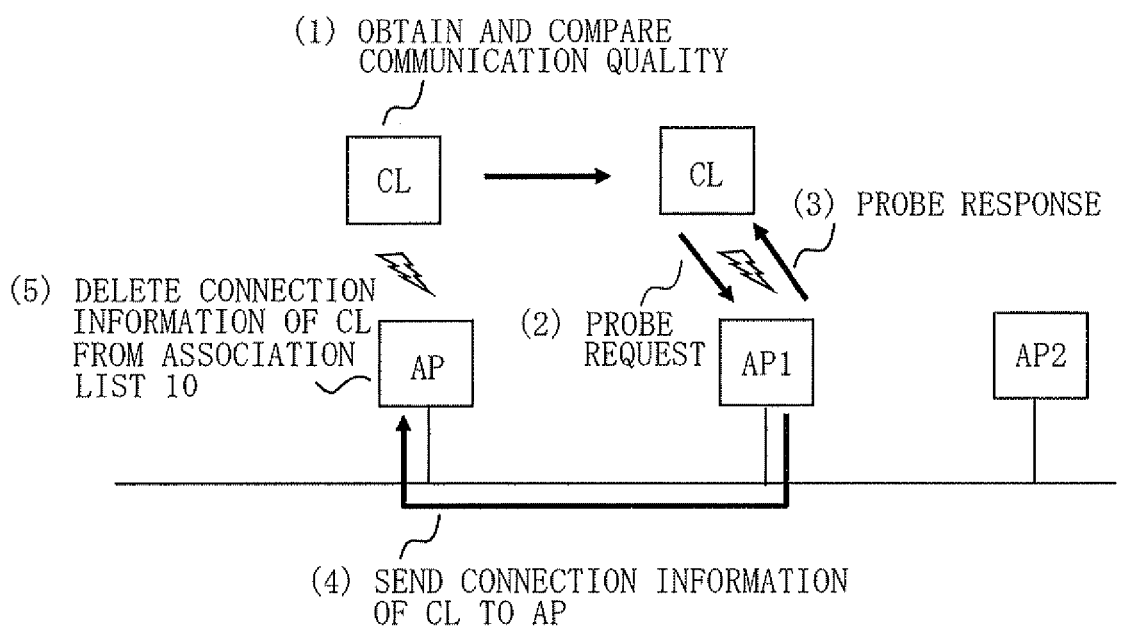
FIG. 8 is a schematic diagram of an operation in which the client roams to another access point.

FIG. 8 is a schematic diagram of an operation in which the client roams to another access point. FIG. 8 shows an example in which three access points which are the access point AP (hereinafter, referred to as AP), the access point AP1 (hereinafter, referred to as AP1), and the access point AP2 (hereinafter, referred to as AP2), and the client (hereinafter, referred to as CL), which have identical setting information, are included in a network. The number of access points or the number of clients is not limited to that shown in the example. In FIG. 8, the AP has completed an operation to detect and record another access point which has setting information identical to the setting information of the access point (the operation of FIG. 3 in which the access point detects and records another access point which has setting information identical to the setting information of the access point). In FIG. 8, the CL has already been connected to the AP.

In FIG. 8, the CL obtains the communication quality of the AP1 and the AP2 by using the wireless MAC addresses of the AP1 and the AP2 recorded in the roaming-allowed wireless access point table 16 of the CL. The CL compares the communication quality of the currently-connected AP with the communication quality of the AP1 and the AP2. The communication quality is evaluated by the reception level (radio field strength), the packet rate, the signal strength, or the like, and may be evaluated by a combination thereof. When the AP1 having better communication quality (for example, AP1 having higher signal strength) than the currently-connected AP is detected, the CL roams to the AP1.

The CL sends a probe request to the AP1, which is a roaming destination. The CL receives a probe response from the AP1. It is assumed at this time that a connection has already been established between the AP1, which is the roaming destination and the CL. Therefore, after receiving the probe response, the CL can establish a connection to the AP1 without sending an authentication request, receiving an authentication response, sending an association request, and receiving an association response. When the connection is established between the CL and the AP, the connection information of the CL has been sent from the AP, connected to the CL, to the another access point (in FIG. 8, the AP1 and the AP2). After receiving the connection information of the CL, the AP1 and the AP2 each have recorded the connection information in their own roaming-target wireless client table 9. The AP1 and the AP2 each have recognized that the CL and the own access point have identical setting information. Therefore, it is unnecessary to exchange data for authentication and connection. Since it is unnecessary to exchange data for authentication and connection, a client switches access points at high speed. As a result, a client can roam to an access point at high speed.

Immediately after roaming, it is also possible for the client not to perform roaming for a predetermined period of time measured by a timer included therein. When roaming is not performed for the predetermined period of time, frequent roaming operations can be avoided. In addition, since access points to which the client can roam are known in advance, it is possible to rapidly detect a roaming-destination access point.

When an access point which has better communication quality than the currently-connected access point is not detected, the client makes an inquiry about and a comparison of communication quality at predetermined time intervals measured by the timer included therein.

The AP1 sends packets which record the connection information of the CL which has roamed to the AP1, to the AP, to which the CL was connected before, via the wired LAN controller 4. The AP receives the packets, which records the connection information of the CL, from the AP1. The AP detects that the CL has been disconnected, because the connection information of the CL recorded in the received packets is the same as the connection information of the CL recorded in the association list 10 of the AP. Then, the AP deletes the setting information and the connection information of the CL from the association list 10.

Figure 9:
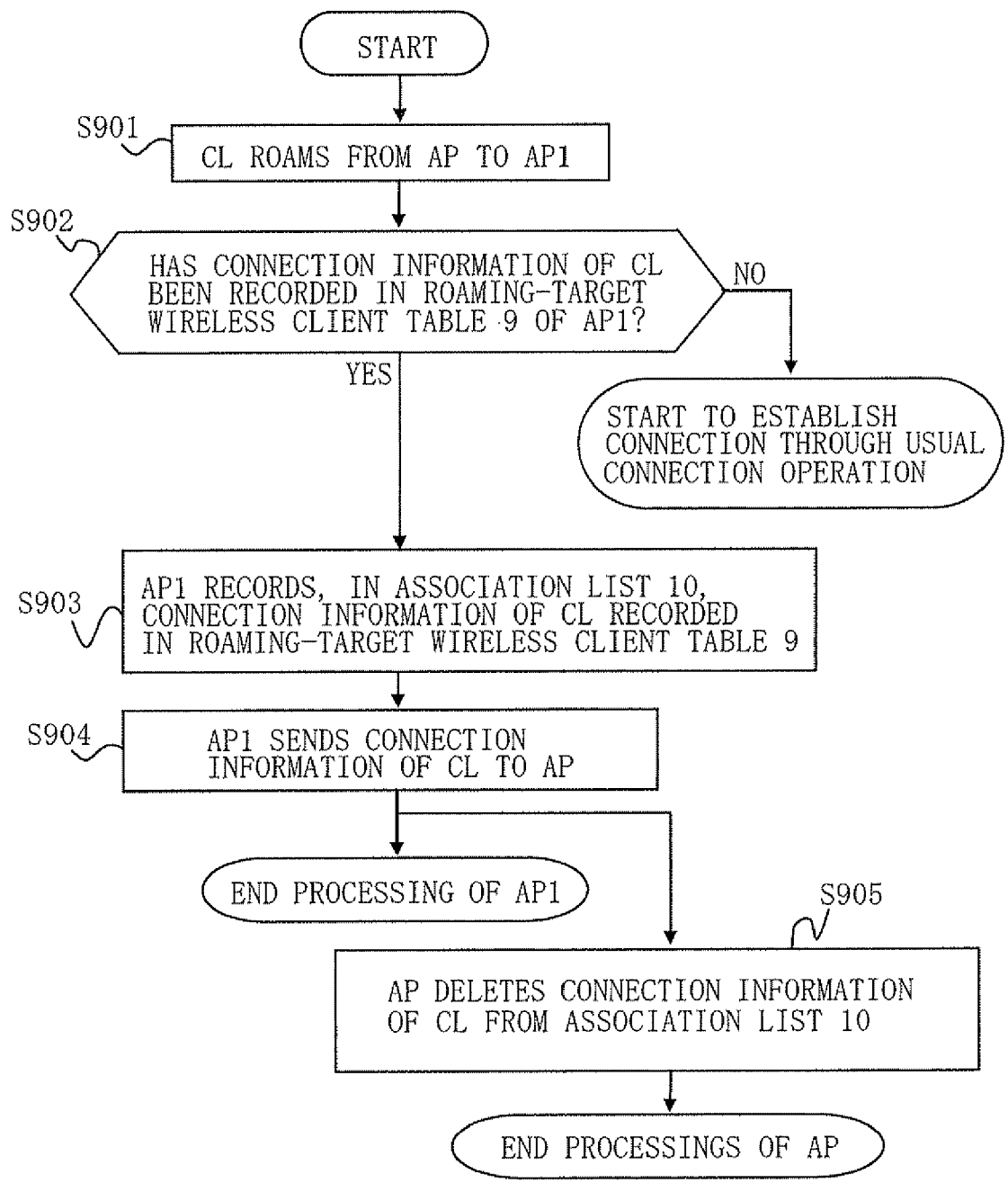
FIG. 9 is a flowchart showing processing in which the access points each update their own association list 10 when roaming is performed between the access points in FIG. 8.

FIG. 9 is a flowchart showing processing in which access points each update their own association list 10 when roaming is performed between the access points in FIG. 8.

First, the CL roams from the AP to the AP1 (S901). Next, the AP1 judges whether the connection information of the CL has been recorded in the roaming-target wireless client table 9 of the AP1 (S902). When the connection information of the CL has not been recorded in the roaming-target wireless client table 9 of the AP1, the AP1 starts to establish a connection through the usual connection operation. On the other hand, when the connection information of the CL has been recorded in the roaming-target wireless client table 9 of the AP1, the AP1 performs a process in Step S903.

The AP1 records the connection information of the CL recorded in the roaming-target wireless client table 9 of the AP1, in the association list 10 of the AP1 (S903). Next, the AP1 sends the connection information of the CL to the AP (S904). The AP1 ends the processing, in which access points each update their own association list 10 when roaming is performed between the access points.

Next, the AP deletes the connection information of the CL from the association list 10 of the AP (S905). The AP ends the processing, in which access points each update their own association list 10 when roaming is performed between the access points. As described above, the association lists 10 of the access points are updated when roaming is performed between the access points.

According to the present disclosure, when it is assumed that a connection has already been established between the client and the access point, the connection can be established without sending an authentication request, receiving an authentication response, sending an association request, and receiving an association response.

SECOND EMBODIMENT

A system according to a second embodiment will be described with reference to FIGS. 10 to 16. An access point used in the second embodiment has the same configuration as the access point used in the first embodiment, shown in FIG. 1. A client used in the second embodiment has the same configuration as the client used in the first embodiment, shown in FIG. 2. Reference symbols identical to those used in the first embodiment are assigned to identical components, and descriptions thereof are omitted. FIGS. 1 and 2 are referred to when needed.

In the second embodiment, the central processing unit 2 executes the control program to perform the following processings. The central processing unit 2 performs relay processing. The relay processing of the central processing unit 2 in the second embodiment is the same as the relay processing of the central processing unit 2 in the first embodiment, so a description thereof is omitted.

The central processing unit 2 receives, via the wired LAN controller 4, packets which record the setting information and the wireless MAC address of another access point, sent from the another access point (the central processing unit 2 corresponds to "a receiving unit").

Further, the central processing unit 2 extracts the setting information and the wireless MAC address of the another access point from the packets received via the wired LAN controller 4, and records the setting information and the wireless MAC address in the roaming-allowed wireless access point table 8 (the central processing unit 2 corresponds to "a recording unit").

Further, the central processing unit 2 compares setting information recorded in the association list 10 with the setting information recorded in the roaming-allowed wireless access point table 8. When the setting information recorded in the association list 10 is identical to the setting information recorded in the roaming-allowed wireless access point table 8, the central processing unit 2 sends packets which records the connection information of a client to an access point which has identical setting information. On the other hand, when the setting information recorded in the association list 10 is not identical to the setting information recorded in the roaming-allowed wireless access point table 8, the central processing unit 2 does not send the connection information of a client to an access point which does not have identical setting information (the central processing unit 2 corresponds to "a transmission control unit").

The central processing unit 2 sends packets which record the wireless MAC address and the setting information of the another access point recorded in the roaming-allowed wireless access point table 8 to the client connected to the own access point via the wireless LAN controller 5 (the central processing unit 2 corresponds to "a provision unit").

In the second embodiment, the central processing unit 12 executes the control program to perform the following processings. The central processing unit 12 performs providing processing. The providing processing of the central processing unit 12 in the second embodiment is the same as the providing processing of the central processing unit 12 in the first embodiment, so a description thereof is omitted.

Further, the central processing unit 12 receives, from the access point connected to the own client, packets which record the setting information and the wireless MAC address of another access point via the wireless LAN controller 14. The central processing unit 12 compares the setting information recorded in the packets received from the access point via the wireless LAN controller 14 with the setting information of the own client. When the setting information recorded in the packets is identical to the setting information of the own client, the central processing unit 12 records the wireless MAC address recorded in the received packets, in the roaming-allowed wireless access point table 16. On the other hand, when the setting information recorded in the packets is not identical to the setting information of the own client, the central processing unit 12 discards the received packets, which records the wireless MAC address and the setting information that is not identical to the setting information of the own client.

Further, while performing communication with the access point connected to the own client, the central processing unit 12 inquires the communication quality of the access point, of the wireless LAN controller 14. The central processing unit 12 receives a value indicating the communication quality of the access point from the wireless LAN controller 14 and records the value in the roaming-allowed wireless access point table 16.

Further, the central processing unit 12 sends broadcast packets at regular intervals via the wireless LAN controller 14. The central processing unit 12 receives a broad response sent from an access point which has received the broadcast packets. Upon reception of the broad response, when the wireless MAC address of the access point which has sent the broad response has been recorded in the roaming-allowed wireless access point table 16, the central processing unit 12 inquires the communication quality of the access point, of the wireless LAN controller 14. The central processing unit 12 receives a value indicating the communication quality of the access point from the wireless LAN controller 14. The central processing unit 12 records the received value indicating the communication quality of the access point in the roaming-allowed wireless access point table 16.

The central processing unit 12 receives a beacon sent by an access point, via the wireless LAN controller 14. Upon reception of the beacon, when the wireless MAC address of the access point which has sent the beacon has been recorded in the roaming-allowed wireless access point table 16, the central processing unit 12 inquires the communication quality of the access point, of the wireless LAN controller 14. The central processing unit 12 receives a value indicating the communication quality of the access point from the wireless LAN controller 14. The central processing unit 12 records the received value indicating the communication quality of the access point in the roaming-allowed wireless access point table 16.

The central processing unit 12 performs communication quality comparing processing and connection request processing. The communication quality comparing processing and the connection request processing performed by the central processing unit 12 in the second embodiment are the same as the communication quality comparing processing and the connection request processing performed by the central processing unit 12 in the first embodiment, so descriptions thereof are omitted.

Figure 10:
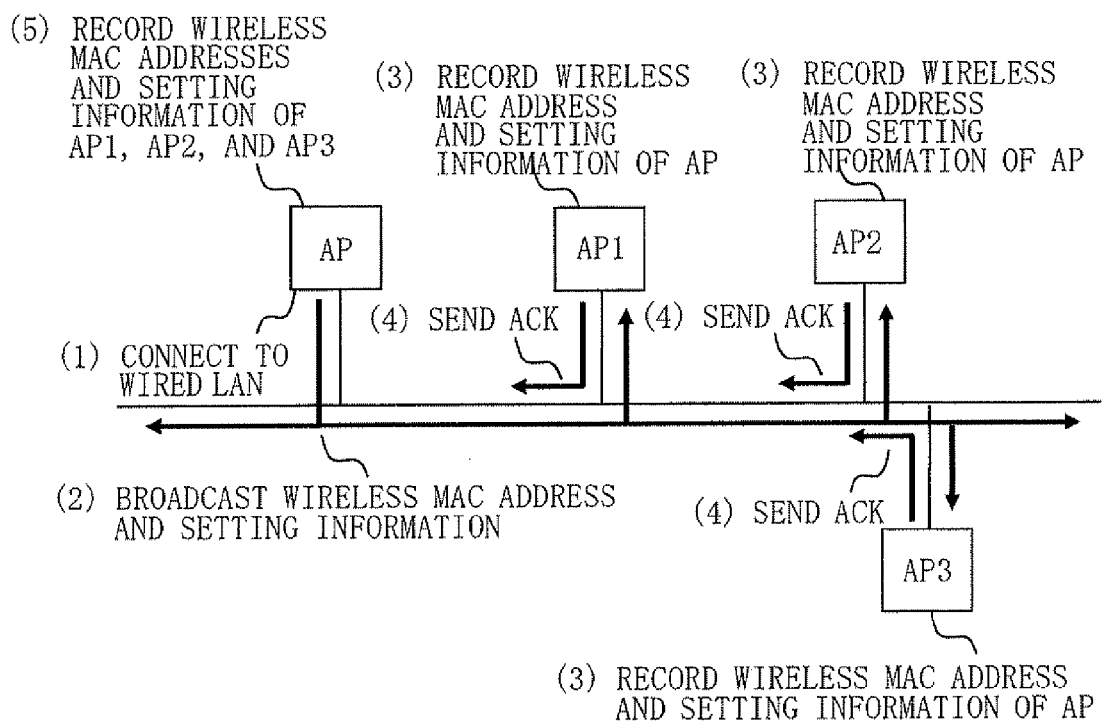
FIG. 10 is a schematic diagram of an operation in which an access point detects and records another access point which has setting information identical to setting information of the access point and another access point which does not have identical setting information.

FIG. 10 is a schematic diagram of an operation in which an access point detects and records other access points which have setting information identical to setting information of the access point and another access point which does not have identical setting information. FIG. 10 shows an example in which the access point AP (hereinafter, referred to as AP), the access point AP1 (hereinafter, referred to as AP1), and the access point AP2 (hereinafter, referred to as AP2), which have identical setting information, and the access point AP3 (hereinafter, referred to as AP3) which does not have identical setting information are included in a network. In FIG. 10, the respective access points are denoted by AP, AP1, AP2, and AP3. FIG. 10 just shows an example and the number of access points is not limited to that shown in the example. It is assumed that having identical setting information means having completely identical setting information or having partially identical setting information. For example, when an identical SSID is specified for the AP and the AP1, WEP and WPA are specified for the AP, and WPA is specified for the AP1, the AP and the AP1 have identical WPA for the security settings. In this case, the AP and the AP1 have identical SSID and WPA in the setting information, which means the pieces of setting information are partially identical. Therefore, it is assumed that the AP and the AP1 have identical setting information.

In FIG. 10, the AP is connected to the wired LAN network. The AP broadcasts packets which record the wired MAC address, the wireless MAC address, and the setting information of the own access point to the access points (in this case, the AP1, the AP2, and the AP3) connected to the wired LAN network. The setting information includes security settings (such as WEP and WPA) and the SSID. The AP1, the AP2, and the AP3 each receive the packets sent from the AP, and record the wireless MAC address and the setting information recorded in the packets in their own roaming-allowed wireless access point table 8.

The AP1, the AP2, and the AP3 each send acknowledgment (ACK) packets to the transmission source AP. The ACK packets records the wired MAC address, the wireless MAC address, and the setting information of the corresponding access point, the AP1, the AP2, or the AP3. In this way, the AP, connected to the wired LAN network, can detect the AP1, the AP2, and the AP3, connected to the wired LAN network.

Further, the AP records the wireless MAC addresses and the setting information of the AP1, the AP2, and the AP3, which have sent back the ACKs, in the roaming-allowed wireless access point table 8, respectively, and ends the processing.

Figure 11:
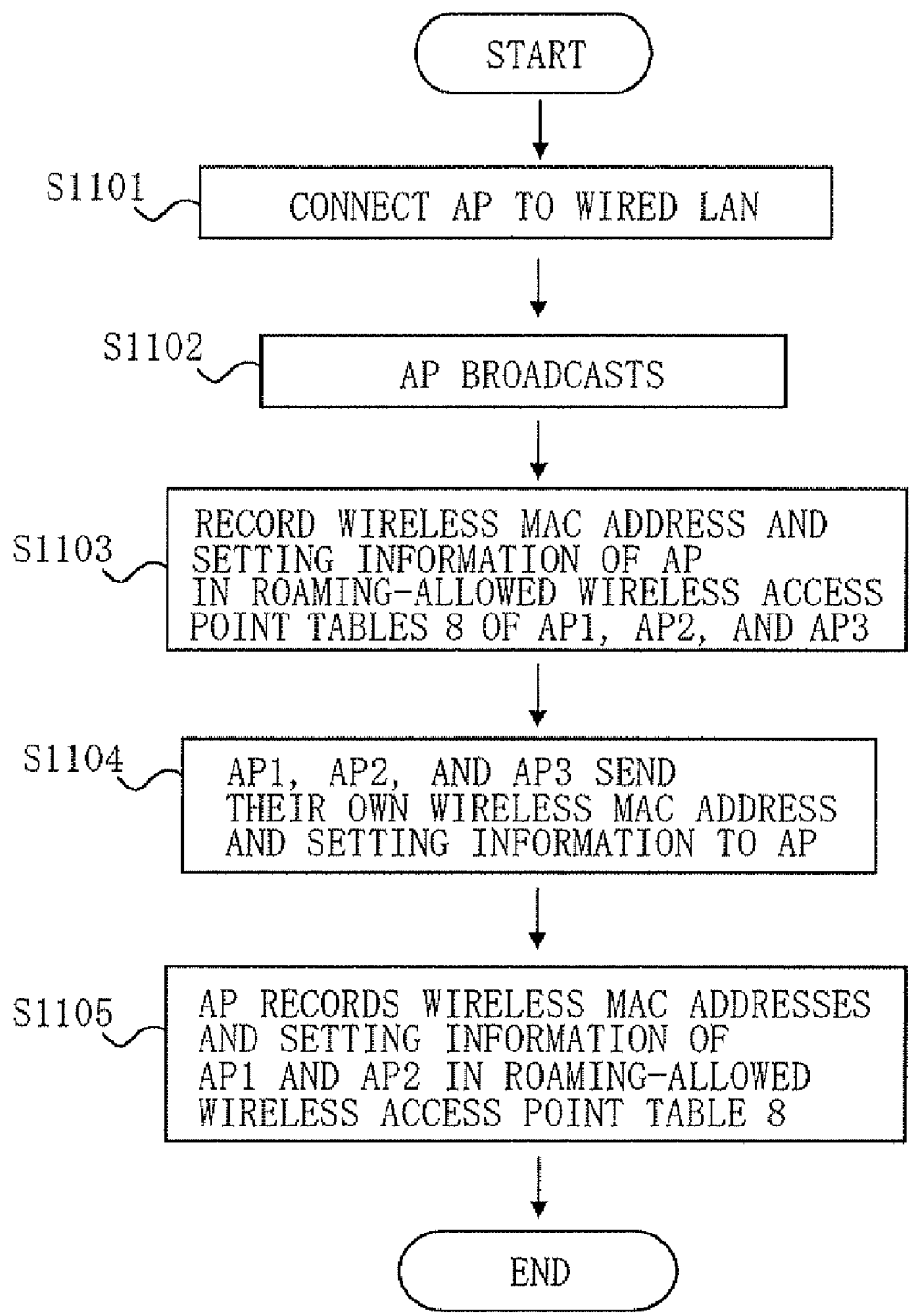
FIG. 11 is a flowchart showing processing in which the access point shown in FIG. 10 detects and records another access point which has setting information identical to setting information of the access point and another access point which does not have identical setting information.

FIG. 11 is a flowchart showing processing in which the access point shown in FIG. 10 detects and records other access points which have setting information identical to the setting information of the access point and another access point which does not have identical setting information. First, the access point AP (denoted by AP shown in FIG. 11) is connected to the wired LAN network (S1101).

Next, the AP broadcasts packets which record the wired MAC address, the wireless MAC address, and the setting information of the AP (S1102). Next, an access point 1 (denoted by AP1 shown in FIG. 11), an access point 2 (denoted by AP2 shown in FIG. 11), and an access point 3 (denoted by AP3 shown in FIG. 11) each record the wireless MAC address and the setting information recorded in the packets received from the AP, in their own roaming-allowed wireless access point table 8 (S1103). Next, the AP1, the AP2, and the AP3 each send ACK packets to the AP, which is the transmission source of the packets (S1104). The ACK packets are recorded with the wired MAC address, the wireless MAC address, and the setting information of the corresponding access point, the AP1, the AP2, or the AP3.

The AP receives the ACK packets and records the wireless MAC addresses and the setting information of the AP1, the AP2, and the AP3 in the roaming-allowed wireless access point table 8 (S1105). As described above, an access point can detect another access point and record the wireless MAC address and the setting information of the another access point in the roaming-allowed wireless access point table 8 of the own access point.

Figure 12:
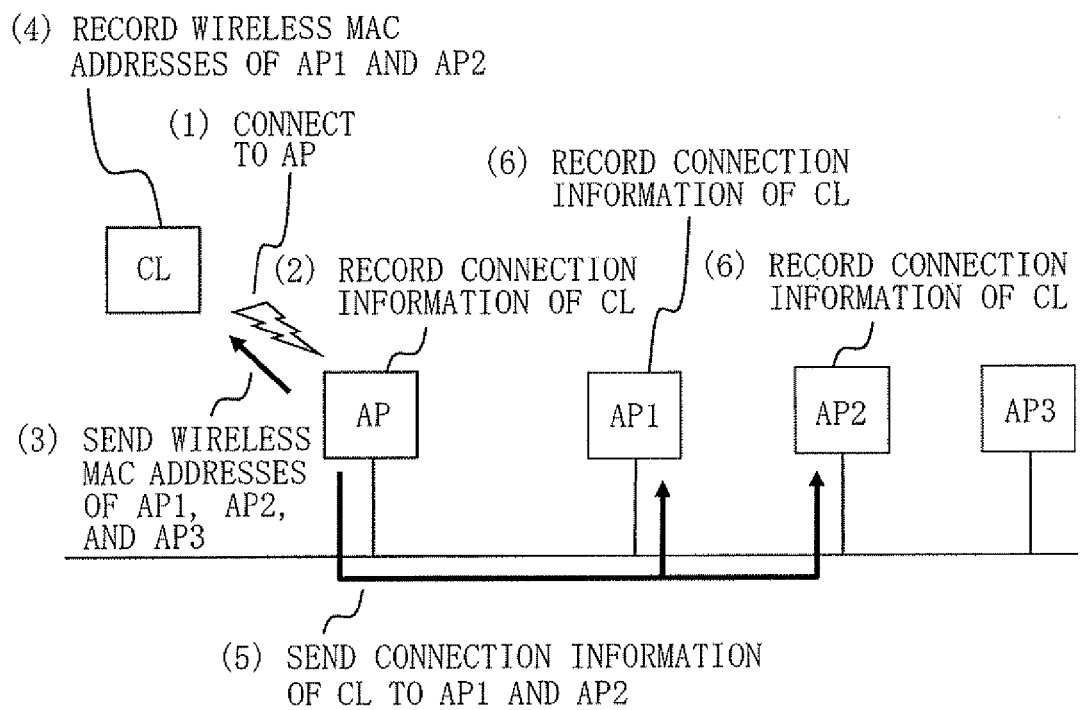
FIG. 12 is a schematic diagram of an operation to connect a client to an access point.

FIG. 12 is a schematic diagram of an operation to connect a client to an access point. FIG. 12 shows an example in which the access point AP (hereinafter, referred to as AP) the access point AP1 (hereinafter, referred to as AP1), the access point AP2 (hereinafter, referred to as AP2), and a client (hereinafter, referred to as CL), which have identical setting information, and the access point AP3 (hereinafter, referred to as AP3) which does not have identical setting information are included in a network. FIG. 12 just shows an example, and the number of access points or the number of clients is not limited to that shown in the example. In FIG. 12, the AP has completed an operation to detect and record other access points (the operation of FIG. 11 in which the access point detects and records other access points which have setting information identical to the setting information of the access point and another access point which does not have identical setting information).

The CL performs a connection operation to connect to the AP via a wireless LAN. The connection operation and timing at which a connection is established are the same as those described with reference to FIG. 5 in the first embodiment, so descriptions thereof are omitted. When the CL has been connected to the AP, the CL records the wireless MAC address of the AP in the roaming-allowed wireless access point table 16. The AP records the connection information of the CL in the association list 10. Further, the AP records the connection information of the CL, which has been connected to the AP, in the roaming-target wireless client table 9.

The AP records information recorded in the roaming-allowed wireless access point table 8 of the AP in packets and sends the packets to the CL. The information recorded in the packets includes the setting information and the wireless MAC addresses of the AP1 the AP2, and the AP3. The CL receives the packets sent from the AP. The CL compares the setting information recorded in each of the packets received from the AP with the setting information of the CL itself. When the setting information recorded in the packets is identical to the setting information of the CL itself, the CL records the wireless MAC addresses recorded in the received packets in the roaming-allowed wireless access point table 16 of the CL.

In FIG. 12, since the setting information of the CL is identical to the setting information of the AP1 and the AP2, the CL records the wireless MAC addresses of the AP1 and the AP2 in the roaming-allowed wireless access point table 16 of the CL. When the CL roams to the AP1 or the AP2, the wireless MAC address of the corresponding access point, the AP1 or the AP2, recorded in the roaming-allowed wireless access point table 16 of the CL is used. It is assumed that a connection to the AP1 or the AP2, whose wireless MAC address is recorded in the roaming-allowed wireless access point table 16 of the CL, has already been established. Specifically, after the connection to the AP is established, the CL receives packets which record the wireless MAC addresses of the AP1 and the AP2, and records the wireless MAC addresses of the AP1 and the AP2 in the roaming-allowed wireless access point table 16. The CL can recognize the AP1 and the AP2, which have setting information identical to the setting information of the CL, by referring to the roaming-allowed wireless access point table 16.

On the other hand, when the setting information recorded in the packets received from the AP is not identical to the setting information of the CL itself, the CL discards the packets, which records the wireless MAC address and the setting information that is not identical to the setting information of the CL itself.

The AP compares the setting information recorded in the association list 10 with the setting information recorded in the roaming-allowed wireless access point table 8. When the setting information recorded in the association list 10 is identical to the setting information recorded in the roaming-allowed wireless access point table 8, the AP records the connection information of the CL in packets and sends the packets to an access point which has identical setting information. On the other hand, when the setting information recorded in the association list 10 is not identical to the setting information recorded in the roaming-allowed wireless access point table 8, the AP does not send packets which record the connection information of the CL to an access point which does not have identical setting information.

In FIG. 12, since the setting information of the CL is identical to the setting information of the AP1 and the AP2, the AP sends packets which record the connection information of the CL to the AP1 and the AP2. On the other hand, since the setting information of the CL is not identical to the setting information of the AP3, the AP does not send packets which record the connection information of the CL to the AP3.

When receiving the packets which record the connection information of the CL, the access point records the connection information recorded in the packets, in the roaming-target wireless client table 9. In FIG. 12, the AP1 and the AP2 each receive the packets which record the connection information of the CL, and record the connection information of the CL in their own roaming-target wireless client table 9.

When the CL roams to the AP1 or the AP2, the CL sends a probe request to the corresponding access point, the AP1 or the AP2, and receives a probe response from the corresponding access point, the AP1 or the AP2. Since the CL has already recognized the AP1 and the AP2 having setting information identical to the setting information of the CL, the CL can establish a connection to the AP1 or the AP2 when receiving the probe response from the AP1 or the AP2, without sending an authentication request, receiving an authentication response, sending an association request, and receiving an association response.

Figure 13:
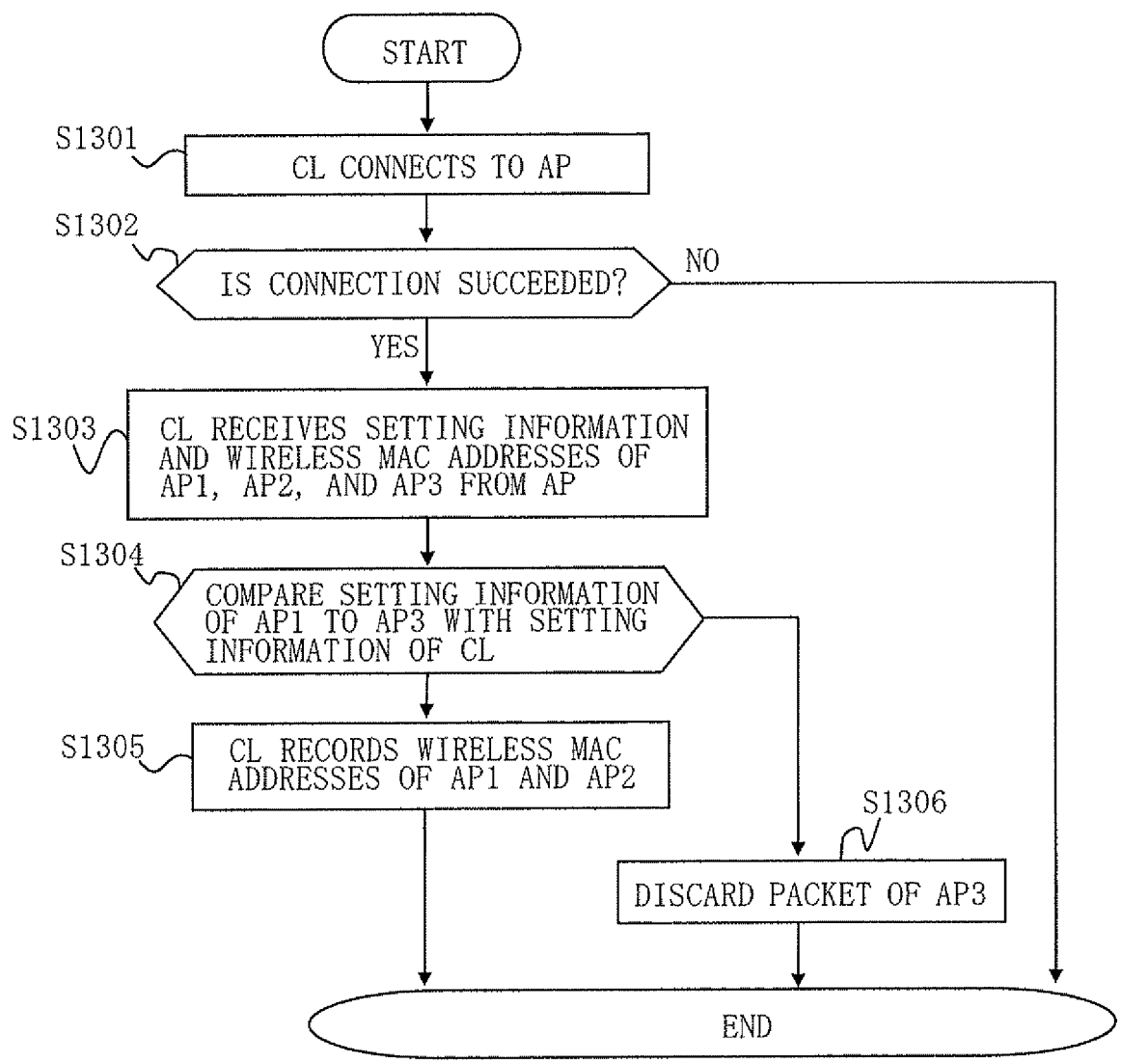
FIG. 13 is a flowchart showing processing in which the client shown in FIG. 12 updates the roaming-allowed wireless access point table 16.

FIG. 13 is a flowchart showing processing in which the client shown in FIG. 12 updates the roaming-allowed wireless access point table 16.

The CL performs a connection operation to connect to the AP (S1301). When a connection has not been established, the processing of updating the roaming-allowed wireless access point table 16 ends. On the other hand, when a connection has been established, a process in Step S1303 is performed (S1302). The AP records the setting information and the wireless MAC addresses of the AP1, the AP2, and the AP3 in packets, respectively, and sends the packets to the CL. The CL receives the packets sent from the AP, which record the setting information and the wireless MAC addresses of the AP1, the AP2, and the AP3, respectively (S1303).

Next, the CL compares the setting information recorded in each of the packets received from the AP with the setting information of the CL itself (S1304). When the setting information recorded in the packets received from the AP is identical to the setting information of the CL itself, the CL performs a process in Step S1305. On the other hand, when the setting information recorded in the packets received from the AP is not identical to the setting information of the CL itself, the CL performs a process in Step S1306. When the setting information recorded in the packets received from the AP is identical to the setting information of the CL itself, the CL records the wireless MAC addresses of the AP1 and the AP2, which have the setting information identical to the setting information of the CL itself, in the roaming-allowed wireless access point table 16 (S1305). After recording the wireless MAC addresses of the AP1 and the AP2 in the roaming-allowed wireless access point table 16, the CL ends the processing of updating the roaming-allowed wireless access point table 16.

On the other hand, when the setting information recorded in the packets received from the AP is not identical to the setting information of the CL itself, the CL discards the packets which record the setting information of the AP3 that is not identical to the setting information of the CL itself (S1306). The CL ends the processing of updating the roaming-allowed wireless access point table 16.

With the processing, it is assumed that a connection to the AP1 or the AP2, recorded in the roaming-allowed wireless access point table 16 of the CL, has already been established. When the CL roams to the AP1 or the AP2, a connection can be established at high speed.

Figure 14:
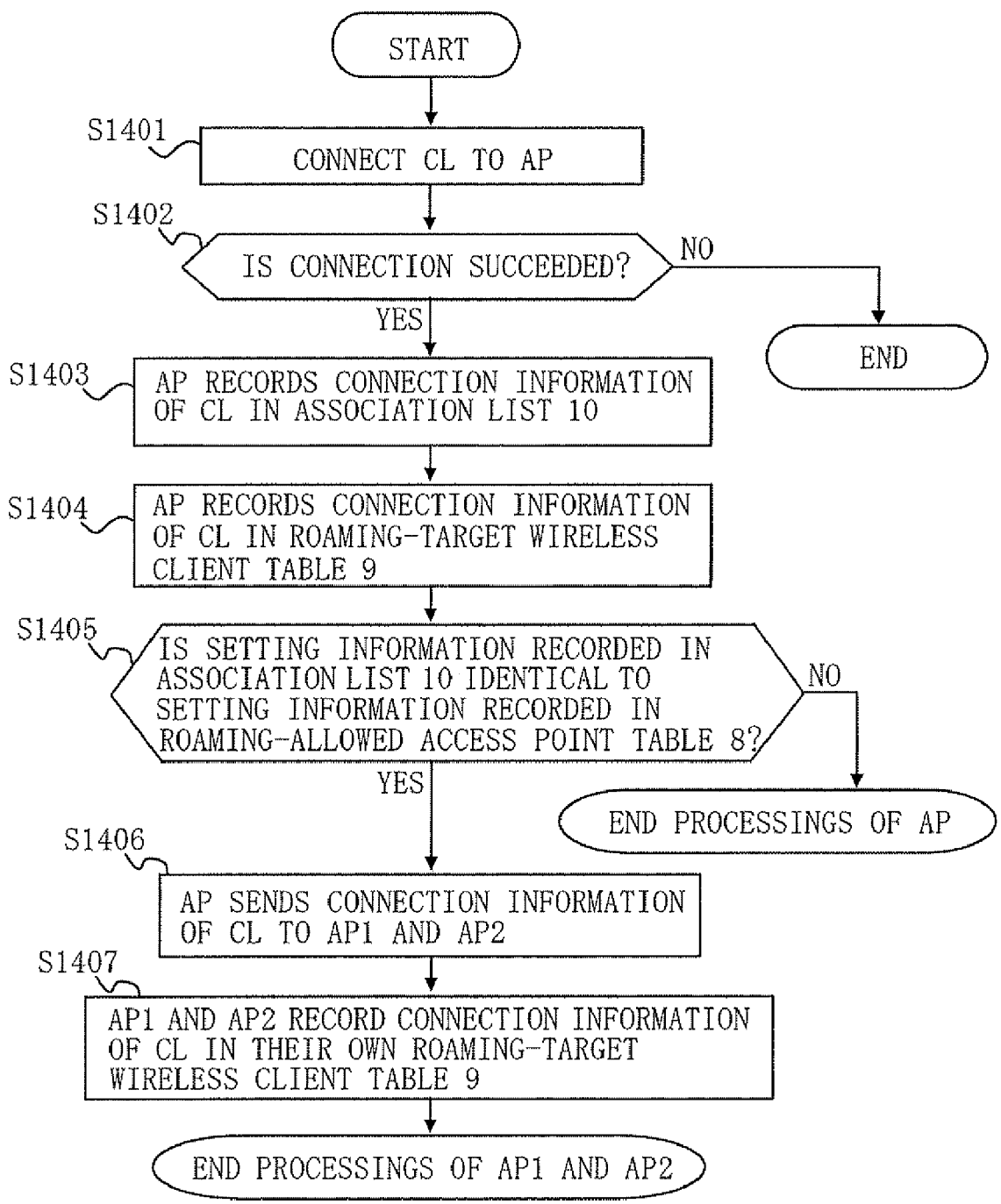
FIG. 14 is a flowchart showing processing in which the access points shown in FIG. 12 each update their own roaming-target wireless client table 9.

FIG. 14 is a flowchart showing processing in which the access points shown in FIG. 12 each update their own roaming-target wireless client table 9.

The CL performs a connection operation to connect to the AP (S1401). When a connection has not been established, the processing of updating the roaming-allowed wireless access point table 16 ends. On the other hand, when a connection has been established, a process in Step S1403 is performed (S1402). The AP records the connection information of the CL, which has been connected to the AP, in the association list 10 of the AP (S1403). Next, the AP records the connection information of the CL, which has been connected to the AP, in the roaming-target wireless client table 9 (S1404).

Next, the AP compares the setting information recorded in the association list 10 with the setting information recorded in the roaming-allowed wireless access point table 8 (S1405).

When the setting information recorded in the association list 10 is identical to the setting information recorded in the roaming-allowed wireless access point table 8, the AP performs a process in Step S1406. On the other hand, when the setting information recorded in the association list 10 is not identical to the setting information recorded in the roaming-allowed wireless access point table 8, the AP ends the processing of updating the roaming-target wireless client table 9.

When the setting information recorded in the association list 10 is identical to the setting information recorded in the roaming-allowed wireless access point table 8, the AP sends packets which record the connection information of the CL to the AP1 and the AP2, which have the identical setting information (S1406).

Next, when the packets which record the connection information of the CL is received from the AP, the AP1 and the AP2 each record the connection information of the CL in their own roaming-target wireless client table 9 (S1407). After recording the connection information of the CL in their own roaming-target wireless client table 9, the AP1 and the AP2 end the processing of updating the roaming-allowed wireless access point table 9. As described above, an access point can update the roaming-target wireless client table 9.

Figure 15:
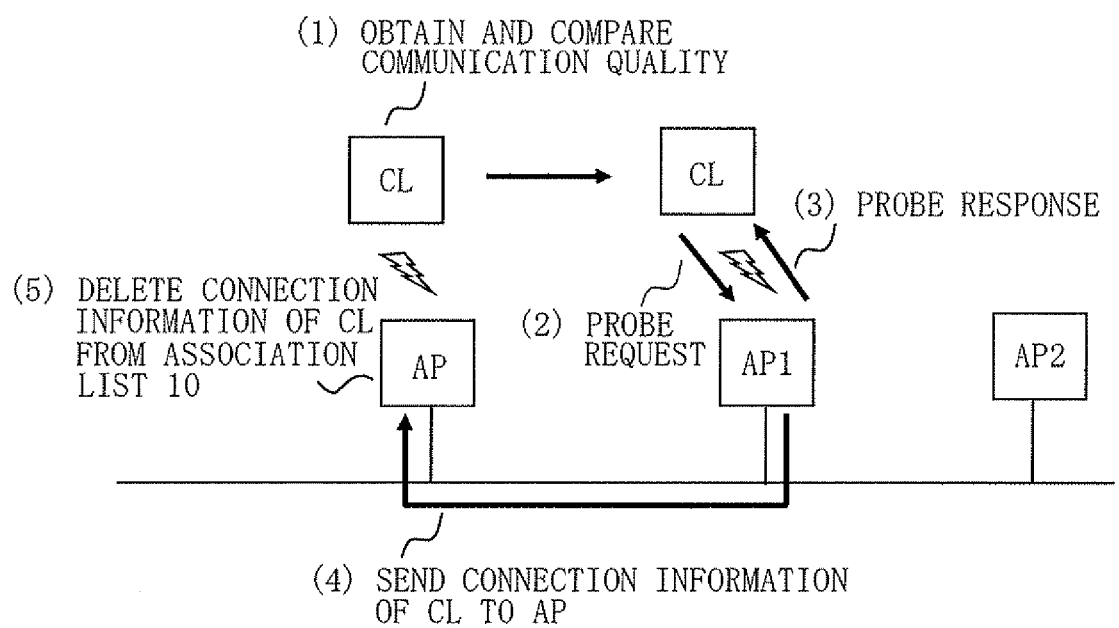
FIG. 15 is a schematic diagram of an operation in which a client roams to another access point.

FIG. 15 is a schematic diagram of an operation in which the client roams to another access point. FIG. 15 shows an example in which the access point AP (hereinafter, referred to as AP), the access point AP1 (hereinafter, referred to as AP1), the access point AP2 (hereinafter, referred to as AP2), and a client (hereinafter, referred to as CL), which have identical setting information, and the access point AP3 (hereinafter, referred to as AP3) (not shown) which does not have identical setting information are included in a network. FIG. 15 just shows an example, and the number of access points or the number of clients is not limited to that shown in the example.

In FIG. 15, the AP has completed an operation to detect and record other access points which have setting information identical to the setting information of the access point and another access point which does not have identical setting information (the operation of FIG. 11 in which the access point detects and records other access points which have setting information identical to the setting information of the access point and another access point which does not have identical setting information). In FIG. 15, the CL has already been connected to the AP.

In FIG. 15, the CL obtains the communication quality of the AP1 and the AP2 by using the wireless MAC addresses of the AP1 and the AP2 recorded in the roaming-allowed wireless access point table 16 of the CL. The CL compares the communication quality of the currently-connected AP with the communication quality of the AP1 and the AP2. Since the AP3 does not have setting information identical to setting information of the CL, the CL does not compare the communication quality of the currently-connected AP with the communication quality of the AP3.

The communication quality is evaluated by the reception level (radio field strength), the packet rate, the signal strength, or the like, and may be evaluated by a combination thereof. When the AP1 having better communication quality (for example, AP1 having higher signal strength) than the currently-connected AP is detected, the CL roams to the AP1.

The CL sends a probe request to the AP1, which is now a roaming destination. The CL receives a probe response from the AP1. At this time, it is assumed that a connection has already been established between the roaming-destination AP1 and the CL. After receiving the probe response, the CL can establish a connection to the AP1 without sending an authentication request, receiving an authentication response, sending an association request, and receiving an association response. The connection information of the CL has been sent to the AP1 and the AP2, which have the setting information identical to the setting information of the CL.

When receiving the connection information of the CL, the AP1 and the AP2 each record the connection information in their own roaming-target wireless client table 9. The AP1 and the AP2 each have recognized that the CL and the own access points have identical setting information. Therefore, it is unnecessary to exchange data for authentication and connection. Since it is unnecessary to exchange data for authentication and connection, a client switches access points at high speed. As a result, a client can roam to an access point at high speed.

Immediately after roaming, it is also possible for the client not to perform roaming for a predetermined period of time measured by a timer included therein. When roaming is not performed for the predetermined period of time, frequent roaming operations can be avoided.

Since access points to which the client can roam are recognized in advance, it is possible to rapidly detect a roaming-destination access point. When an access point which has better communication quality than the currently-connected access point is not detected, the client makes an inquiry about and a comparison of communication quality at predetermined time intervals measured by the timer included therein.

The AP1 sends packets which record the connection information of the CL which has roamed to the AP1, to the AP, to which the CL was connected before, via the wired LAN controller 4. The AP receives the packets, which record the connection information of the CL, from the AP1. The AP detects that the CL has been disconnected, because the connection information of the CL recorded in the received packets is the same as the connection information of the CL recorded in the association list 10 of the AP. Then, the AP deletes the setting information and the connection information of the CL from the association list 10.

FIG. 16 is a flowchart showing processing in which access points each update their own the association list 10 when roaming is performed between the access points in FIG. 15.

First, the CL roams from the AP to the AP1 (S1601). Next, the AP1 judges whether the connection information of the CL has been recorded in the roaming-target wireless client table 9 of the AP1 (S1602). When the connection information of the CL has not been recorded in the roaming-target wireless client table 9 of the AP1, the AP1 starts to establish a connection through the usual connection operation. On the other hand, when the connection information of the CL has been recorded in the roaming-target wireless client table 9 of the AP1, the AP1 performs a process in Step S1603.

The AP1 records the connection information of the CL recorded in the roaming-target wireless client table 9 of the AP1, in the association list 10 of the AP1 (S1603). Next, the AP1 sends the connection information of the CL to the AP (S1604). The AP1 ends the processing, in which access points each update their own association list 10 when roaming is performed between the access points.

Next, the AP deletes the connection information of the CL from the association list 10 of the AP (S1605). The AP ends the processing, in which access points each update their own association list 10 when roaming is performed between the access points. As described above, the association lists 10 of the access points are updated when roaming is performed between the access points.

According to the present disclosure, when it is assumed that a connection has already been established between the client and the access point, the connection can be established without sending an authentication request, receiving an authentication response, sending an association request, and receiving an association response.

OPERATION AND EFFECT OF EMBODIMENTS

As described above, according to the embodiments, since a client does not perform disconnection and reconnection processings at the time of roaming, the client can instantly switch access points to be connected. Further, since only drivers and software of existing devices are required to be changed, dedicated hardware, a special server or the like is not necessary. This is greatly advantageous because no cost is required therefor. Further, since roaming can be realized at high speed, it is possible to prevent packet loss or packet delay which may occur during roaming from causing an instantaneous interruption in sound, frame skipping in moving image, and the like in communications for sounds and moving images, which should be performed in real time.

<Computer Readable Recording Medium>

It is possible to record a program which causes a computer to implement any of the functions described above on a computer readable recording medium. By causing the computer to read in the program from the recording medium and execute it, the function thereof can be provided. The computer readable recording medium mentioned herein indicates a recording medium which stores information such as data and a program by an electric, magnetic, optical, mechanical, or chemical operation and allows the stored information to be read from the computer. Of such recording media, those detachable from the computer include, e.g., a flexible disk, a magneto-optical disk, a CD-ROM, a CD-R/W, a DVD, a DAT, an 8-mm tape, and a memory card. Of such recording media, those fixed to the computer include a hard disk and a ROM (Read Only Memory).

What is claimed is:

1. A wireless communication device that performs communication via a communication device, comprising:
    a providing unit to provide the communication device with information which includes a predetermined authentication condition when a connection request is sent to the communication device;
    a reception unit to receive identification information identifying other communication devices and a predetermined authentication condition of the other communication devices from the communication device which has permitted a connection in response to the connection request;
    a judging unit to judge whether the received predetermined authentication condition of the other communication devices matches the predetermined authentication condition of the wireless communication device;
    a recording unit to record the identification information identifying the other communication devices having the authentication condition that matches the predetermined authentication condition of the wireless communication device when the received predetermined authentication condition of the other communication devices matches the predetermined authentication condition of the wireless communication device;
    a collecting unit to collect communication qualities of information provided by the other communication devices identified by the recorded identification information identifying the other communication devices, and communication quality of information provided by the communication device which has permitted the connection;
    a comparing unit to compare the communication qualities of information collected from the other communication devices with the communication quality of information provided by the communication device which has permitted the connection;
    a determining unit to determine, based on a result obtained by the comparing unit, one of the other communication devices which provide information with the communication quality better than the communication quality of information provided by the communication device which has permitted the connection; and
    a connection request unit to send the connection request to the determined one of the other communication devices.

2. A control method for a wireless communication device, comprising:
    providing the communication device with information which includes a predetermined authentication condition when a connection request is sent to a communication device;
    receiving identification information identifying other communication devices and a predetermined authentication condition of the other communication devices from the communication device which has permitted a connection in response to the connection request;
    judging whether the received predetermined authentication condition of the other communication devices matches the predetermined authentication condition of the wireless communication device;
    recording the identification information identifying the other communication devices having the authentication condition that matches the predetermined authentication condition of the wireless communication device when the received predetermined authentication condition of the other communication devices matches the predetermined authentication condition of the wireless communication device;

collecting communication qualities of information provided by the other communication devices identified by the recorded identification information identifying the other communication devices, and communication quality of information provided by the communication device which has permitted the connection;

comparing the communication qualities of information collected from the other communication devices with a communication quality of information provided by the communication device which has permitted the connection;

determining, based on a result obtained in the comparing step, one of the other communication devices which provide information with a the communication quality better than the communication quality of information provided by the communication device which has permitted the connection; and sending the connection request to the determined one of the other communication devices.

3. A recording medium recorded with a wireless communication device control program which causes a wireless communication device to execute:

providing the communication device with information which includes a predetermined authentication condition when a connection request is sent to a communication device;

receiving identification information identifying other communication devices and a predetermined authentication condition of the other communication devices from the communication device which has permitted a connection in response to the connection request;

judging whether the received predetermined authentication condition of the other communication devices matches the predetermined authentication condition of the wireless communication device;

recording the identification information identifying the other communication devices having the authentication condition that matches the predetermined authentication condition of the wireless communication device when the received predetermined authentication condition of the other communication devices matches the predetermined authentication condition of the wireless communication device;

collecting communication qualities of information provided by the other communication devices identified by the recorded identification information identifying the other communication devices, and communication quality of information provided by the communication device which has permitted the connection;

comparing the communication qualities of information collected from the other communication devices with a communication quality of information provided by the communication device which has permitted the connection;

determining, based on a result obtained in the comparing step, one of the other communication devices which provide information with the communication quality better than the communication quality of information provided by the communication device which has permitted the connection; and sending the connection request to the determined one of the other communication devices.

4. A system comprising a communication device and a wireless communication device, the communication device including an authentication unit that authenticates, when a connection request is received from the wireless communication device, the wireless communication device depending on whether a predetermined authentication condition is satisfied, and a relay unit that relays communication performed by the wireless communication device when the authentication unit successfully authenticates the wireless communication device, the wireless communication device performing communication via the communication device, wherein:

the communication device includes:

an information transmission and reception unit to receive connected-terminal information, which includes identification information identifying the wireless communication device whose communication is being relayed, held by other communication devices;

a recording unit to record the received connected-terminal information;

a receiving unit to receive, from the other communication devices, condition information which includes a predetermined authentication condition and identification information identifying the other communication devices;

a judging unit to judge, when the connection request is received from the wireless communication device, whether the identification information identifying the wireless communication device is included in the recorded connected-terminal information;

a permitting unit to permit relaying of communication performed by the wireless communication device when the identification information of the wireless communication device is included in the recorded connected-terminal information; and an information providing unit to provide the received identification information identifying the other communication devices to the wireless communication device whose communication is permitted relaying by the permitting unit; and the wireless communication device includes:

a providing unit to provide the communication device with information which includes a predetermined authentication condition of the wireless communication device when a connection request is sent to the communication device;

a reception unit to receive identification information identifying other communication devices from the communication device which has permitted a connection in response to the connection request;

a collecting unit to collect communication qualities of information provided by the other communication devices identified by the received identification information identifying the other communication devices;

a comparing unit to compare the communication qualities of information collected form the other communication devices with a communication quality of information provided by the communication device which has permitted the connection;

a determining unit to determine, based on a result obtained by the comparing unit, one of the other communication devices which provide information with the communication quality better than the communication quality of information provided by the communication device which has permitted the connection; and a connection request unit to send the connection request to the determined one of the other communication devices.

5. The system according to claim 4, wherein the judging unit judges whether the condition information received from the other communication devices matches the predetermined authentication condition of the communication device, and the information transmission and reception unit includes a recording control unit to record the connected-terminal information received from the other communication devices when the condition information received from the other communication devices matches the predetermined authentication condition of the communication device.

6. The system according to claim 5, wherein the receiving unit records the identification information identifying the other communication devices when the condition information received from the other communication devices matches the predetermined authentication condition of the communication device.

7. The system according to claim 6, wherein the information providing unit includes a providing control unit to provide the identification information identifying the other communication devices for the wireless communication device whose communication is permitted relaying by the permitting unit when the identification information identifying the other communication devices is recorded.

8. The system according to claim 4, wherein the judging unit judges whether the received condition information matches the recorded connected-terminal information, and the information transmission and reception unit includes a transmission control unit to send, when the received condition information matches the recorded connected-terminal information, the connected-terminal information to the other communication devices, which are transmission sources of the received condition information.

9. A system comprising a communication device and a wireless communication device, the communication device including an authentication unit that authenticates, when a connection request is received from the wireless communication device, the wireless communication device depending on whether a predetermined authentication condition is satisfied, and a relay unit that relays communication performed by the wireless communication device when the authentication unit successfully authenticates the wireless communication device, the wireless communication device performing communication via the communication device, wherein:

the communication device includes:
an information transmission and reception unit to receive connected-terminal information, which includes identification information identifying the wireless communication device whose communication is being relayed, held by other communication devices;
a recording unit to record the received connected-terminal information;
a receiving unit to receive, from the other communication devices, condition information which includes a predetermined authentication condition and identification information identifying the other communication devices;
a judging unit to judge, when the connection request is received from the wireless communication device, whether the identification information identifying the wireless communication device is included in the recorded connected-terminal information;
a permitting unit to permit relaying of communication performed by the wireless communication device when the identification information of the wireless communication device is included in the recorded connected-terminal information; and
an information providing unit to provide the received condition information to the wireless communication device whose communication is permitted relaying by the permitting unit; and the wireless communication device includes:
a providing unit to provide the communication device with information which includes a predetermined authentication condition of the wireless communication device when a connection request is sent to the communication device;
a reception unit to receive the condition information from the communication device which has permitted a connection in response to the connection request;
a judgment unit to judge whether the condition information received from the communication device which has permitted the connection matches the predetermined authentication condition of the wireless communication device;
a recording control unit to record the identification information identifying the other communication devices when the condition information received from the communication device which has permitted the connection matches the predetermined authentication condition of the wireless communication device;
a collecting unit to collect communication qualities of information provided by the other communication devices identified by the recorded identification information identifying the other communication devices;
a comparing unit to compare the communication qualities of information collected from the other communication devices with a communication quality of information provided by the communication device which has permitted the connection;
a determining unit to determine, based on a result obtained by the comparing unit, one of the other communication devices which provide information with the communication quality better than the communication quality of information provided by the communication device which has permitted the connection; and
a connection request unit to send the connection request to the determined one of the other communication devices.

10. The system according to claim 9, wherein, in the communication device;
the recording unit records the condition information received from the other communication devices;
the judging unit judges whether the recorded condition information matches the recorded connected-terminal information; and
the information transmission and reception unit includes a transmission control unit to send, when the recorded condition information matches the recorded connected-terminal information, the connected-terminal information to the other communication devices, which are the transmission sources of the recorded condition information.

11. The system according to claim 10, wherein the communication device further includes a providing unit to provide the recorded condition information to the wireless communication device whose communication is permitted relaying by the permitting unit.

* * * * *

UNITED STATES PATENT AND TRADEMARK OFFICE
CERTIFICATE OF CORRECTION

PATENT NO. : 8,203,996 B2  
APPLICATION NO. : 12/191612  
DATED : June 19, 2012  
INVENTOR(S) : Yasuhiko Masuda Page 1 of 1

It is certified that error appears in the above-identified patent and that said Letters Patent is hereby corrected as shown below:

Column 27, Line 17, In Claim 2, after "information with" delete "a".

Column 28, Line 54, In Claim 4, delete "form" and insert -- from --, therefor.

Signed and Sealed this  
Fourth Day of September, 2012

David J. Kappos  
*Director of the United States Patent and Trademark Office*